United States Patent
Itwaru

(10) Patent No.: US 9,734,498 B2
(45) Date of Patent: Aug. 15, 2017

(54) MOBILE IMAGE PAYMENT SYSTEM USING SHORT CODES

(75) Inventor: Mark Itwaru, Toronto (CA)

(73) Assignee: Riavera Corp, Toronto (CA)

( * ) Notice: Subject to any disclaimer, the term of this patent is extended or adjusted under 35 U.S.C. 154(b) by 0 days.

(21) Appl. No.: 13/469,931

(22) Filed: May 11, 2012

(65) Prior Publication Data

US 2013/0124413 A1   May 16, 2013

Related U.S. Application Data

(63) Continuation-in-part of application No. PCT/CA2012/000223, filed on Mar. 12, 2012, and a
(Continued)

(30) Foreign Application Priority Data

May 27, 2011   (CA) ..................................... 2741240

(51) Int. Cl.
G06Q 20/20 (2012.01)
G07G 1/12 (2006.01)
(Continued)

(52) U.S. Cl.
CPC ......... *G06Q 20/4012* (2013.01); *G06Q 20/02* (2013.01); *G06Q 20/20* (2013.01); *G06Q 20/3276* (2013.01); *G06Q 30/02* (2013.01)

(58) Field of Classification Search
USPC ........................... 705/14.51, 16, 26.1, 17, 18
See application file for complete search history.

(56) References Cited

U.S. PATENT DOCUMENTS

| 5,729,594 A | 3/1998 | Klingman |
| 5,778,173 A | 7/1998 | Apte |

(Continued)

FOREIGN PATENT DOCUMENTS

| CA | 2769235 A1 | 2/2011 | |
| CH | EP 2 088 549 A1 * | 12/2009 | ............. G06Q 20/00 |

(Continued)

OTHER PUBLICATIONS

International Search Report and Written Opinion dated Aug. 27, 2012 issued from the Canadian Intellectual Property Office relating to PCT International Patent Application No. PCT/CA2012/000453.
(Continued)

*Primary Examiner* — Scott Zare
*Assistant Examiner* — Reva R Danzig
(74) *Attorney, Agent, or Firm* — Grant Tisdall; Gowling WGL (Canada) LLP

(57) ABSTRACT

A Mobile Image Payment System for mobile commerce, which enables a Consumer to use a mobile device to make payments for online, Electronic Media, Print Media and POS Transactions, involving the presentment of a short code. In an embodiment, the Consumer scans the short code that is displayed by a merchant, to initiate a transaction. The system completes the transaction by processing information between a Mobile Payment Client residing on the Consumer's mobile device, a Mobile Payment interface residing on a Transaction Server, and, in a further embodiment, a Mobile Payment Application residing on a merchant's device or POS terminal. The Consumer's mobile device communicates with a Payment Platform, which communicates with a Merchant Transaction Server in order to process and complete the mobile transaction. The short code of the merchant can be displayed on any product or advertising medium.

14 Claims, 11 Drawing Sheets

Related U.S. Application Data continuation-in-part of application No. 13/105,803, filed on May 11, 2011, and a continuation-in-part of application No. 13/397,215, filed on Feb. 15, 2012, and a continuation-in-part of application No. 13/397,297, filed on Feb. 15, 2012.

(60) Provisional application No. 61/485,075, filed on May 11, 2011.

(51) Int. Cl.
*G06Q 30/06* (2012.01)
*G06Q 20/40* (2012.01)
*G06Q 20/32* (2012.01)
*G06Q 20/02* (2012.01)
*G06Q 30/02* (2012.01)

(56) References Cited

U.S. PATENT DOCUMENTS

| | | |
|---|---|---|
| 5,799,285 A | 8/1998 | Klingman |
| 5,903,721 A | 5/1999 | Sixtus |
| 5,923,735 A * | 7/1999 | Swartz ............... G07F 7/00 235/472.01 |
| 5,963,915 A | 10/1999 | Kirsch |
| 5,970,475 A | 10/1999 | Barnes et al. |
| 5,992,752 A | 11/1999 | Wilz, Sr. et al. |
| 6,012,144 A | 1/2000 | Pickett |
| 6,038,589 A | 3/2000 | Holdsworth |
| 6,058,250 A | 5/2000 | Harwood et al. |
| 6,078,902 A | 6/2000 | Schenkler |
| 6,086,618 A | 7/2000 | Al-Hilali et al. |
| 6,088,683 A | 7/2000 | Jalili |
| 6,138,146 A | 10/2000 | Moon et al. |
| 6,233,565 B1 | 5/2001 | Lewis et al. |
| 6,332,134 B1 | 12/2001 | Foster |
| 6,675,008 B1 | 1/2004 | Paik et al. |
| 6,704,873 B1 | 3/2004 | Underwood |
| 7,379,921 B1 | 5/2008 | Kiliccote |
| 7,387,250 B2 | 6/2008 | Muni |
| 7,581,257 B1 | 8/2009 | O'Hara |
| 8,016,187 B2 | 9/2011 | Frantz et al. |
| 8,275,699 B2 | 9/2012 | Shader et al. |
| 2002/0062281 A1 | 5/2002 | Singhal |
| 2002/0066039 A1 | 5/2002 | Dent |
| 2002/0066042 A1 | 5/2002 | Matsumoto et al. |
| 2002/0069165 A1 * | 6/2002 | O'Neil ............... G06Q 20/04 705/40 |
| 2002/0077976 A1 | 6/2002 | Meyer et al. |
| 2002/0107745 A1 * | 8/2002 | Loeser ............... G06Q 20/04 705/21 |
| 2003/0195843 A1 | 10/2003 | Matsuda et al. |
| 2005/0029358 A1 | 2/2005 | Mankins et al. |
| 2005/0125301 A1 | 6/2005 | Muni |
| 2005/0197968 A1 | 9/2005 | Das et al. |
| 2007/0119917 A1 | 5/2007 | Tomikawa et al. |
| 2007/0194123 A1 | 8/2007 | Frantz et al. |
| 2007/0228148 A1 * | 10/2007 | Rable ............... G06Q 20/10 235/379 |
| 2007/0244811 A1 | 10/2007 | Tumminaro |
| 2007/0255620 A1 * | 11/2007 | Tumminaro ........... G06Q 20/10 705/14.27 |
| 2008/0172314 A1 | 7/2008 | Hahn-Carlson |
| 2008/0222048 A1 | 9/2008 | Higgins et al. |
| 2008/0285755 A1 | 11/2008 | Camus et al. |
| 2008/0313081 A1 | 12/2008 | Wee |
| 2009/0090783 A1 | 4/2009 | Killian et al. |
| 2009/0108080 A1 | 4/2009 | Meyer et al. |
| 2009/0222353 A1 | 9/2009 | Guest et al. |
| 2009/0240626 A1 | 9/2009 | Hasson et al. |
| 2009/0254479 A1 | 10/2009 | Pharris |
| 2009/0254485 A1 | 10/2009 | Baentsch et al. |
| 2009/0266893 A1 | 10/2009 | Chen |
| 2010/0138344 A1 | 6/2010 | Wong et al. |
| 2010/0169223 A1 | 7/2010 | Yuan |
| 2010/0211506 A1 | 8/2010 | Chang et al. |
| 2011/0055033 A1 * | 3/2011 | Chen ............... G06Q 20/20 705/18 |
| 2011/0137742 A1 * | 6/2011 | Parikh ............... G06Q 20/04 705/26.1 |
| 2011/0145093 A1 | 6/2011 | Paradise et al. |
| 2011/0212707 A1 | 9/2011 | Mahalal |
| 2011/0244920 A1 | 10/2011 | Coppinger |
| 2011/0251892 A1 * | 10/2011 | Laracey ............. G06Q 30/0253 705/14.51 |
| 2012/0030121 A1 | 2/2012 | Grellier |
| 2012/0066081 A1 | 3/2012 | Shader et al. |
| 2012/0078751 A1 | 3/2012 | Macphail et al. |
| 2012/0130889 A1 | 5/2012 | Lyons et al. |
| 2012/0136797 A1 | 5/2012 | Coppinger |
| 2012/0290418 A1 | 11/2012 | Itwaru |

FOREIGN PATENT DOCUMENTS

| | | | |
|---|---|---|---|
| CH | EP 2088549 A1 * | 12/2009 | ............. G06Q 20/00 |
| DE | 102007059816 A1 | 6/2009 | |
| EP | 0765068 A2 | 3/1997 | |
| EP | 0813325 A2 | 12/1997 | |
| EP | 0926611 A2 | 6/1999 | |
| EP | 1921578 A1 | 5/2008 | |
| EP | 2073160 A1 | 6/2009 | |
| EP | 2088549 A1 | 8/2009 | |
| WO | 9637848 A1 | 11/1996 | |
| WO | 0195591 A1 | 12/2001 | |
| WO | 02102133 A2 | 12/2002 | |
| WO | 2011112752 A1 | 9/2011 | |
| WO | 2011127354 A2 | 10/2011 | |
| WO | 2011130422 A2 | 10/2011 | |
| WO | 2012111019 A1 | 8/2012 | |
| WO | 2012151660 A1 | 11/2012 | |
| WO | 2012158506 A1 | 11/2012 | |

OTHER PUBLICATIONS

Gao, et al., "A 2D Barcode-Based Mobile Payment System", 2009 Third International Conference on Multimedia and Ubiquitous Engineering, pp. 320-329, Jun. 4-6, 2009.

International Search Report and Written Opinion dated Apr. 29, 2013 issued from the Canadian Intellectual Property Office relating to PCT International Patent Application No. PCT/CA2013/000136.

International Search Report and Written Opinion dated Jul. 30, 2012 issued from the Canadian Intellectual Property Office relating to PCT International Patent Application No. PCT/CA2012/000452.

Ion, et al., "Don't trust POS terminals! Verify in-shop payments with your phone", presented at Pervasive 2008 Sixth International Conference on Persuasive Computing, Sydney Australia, http://www.persuasive2008.org/.

International Search Report and Written Opinion dated Apr. 15, 2013 issued from the Canadian Intellectual Property Office relating to PCT International Patent Application No. PCT/CA2013/000135.

International Search Report and Written Opinion dated May 24, 2012 issued by the Canadian Intellectual Property Office relating to PCT International Application No. PCT/CA2012/000223.

International Search Report and Written Opinion dated May 24, 2012 issued from the Canadian Intellectual Property Office relating to PCT International Patent Application No. PCT/CA2012/000223.

* cited by examiner

MOBILE IMAGE PAYMENT SYSTEM USING SHORT CODES

CROSS-REFERENCE TO RELATED APPLICATIONS

This application is a non provisional of U.S. Provisional Application No. 61/485,075 filed May 11, 2011, which is a Continuation in part of PCT International Application No. PCT/CA2012/000223 filed Mar. 12, 2012, which is a Continuation in part of U.S. application Ser. No. 13/105,803 filed May 11, 2011, which is a continuation in part of U.S. application Ser. No. 13/397,215 filed Feb. 15, 2012, which is a Continuation in part of U.S. application Ser. No. 13/397,297 filed Feb. 15, 2012, the contents of which are incorporated herein in their entirety.

FIELD

The present disclosure relates to a mobile device payment processing system.

BACKGROUND

For years, the telecommunications, banking and payment processing industries have been trying to engineer a mobile transaction processing technology (predominantly for point of sale mobile transactions) that is secure, efficient and easy to use. Their inability to do so has effectively relegated the mobile transaction market to predominantly the purchase of downloadable items such as ringtones and music.

In addition, consumers' concerns over the security of mobile payment systems have hindered the widespread adoption of such technology. In traditional credit card or debit card based Point of Sale systems, when a consumer makes a purchase, the consumer's sensitive payment account information is generally processed between a merchant's POS Terminal and a Payment Platform (such as that of a credit card company, bank or other financial institution). Further, the consumer is typically required to enter personal identification numbers ("PINs"), or other such verification information such as passwords, on the merchant's POS Terminal. While such technology is widely adopted, in the case of mobile payment systems in particular, there remains a need to provide for enhanced security by removing much of such payment processing functions away from the merchant POS Terminal.

In particular, providing one entity with some control in how their personal financial information is provided to directly another entity (e.g. between consumer and merchant) involved in the funds transfer has so far been elusive. This inability to involve more entity control of the funds transfer between entities while at the same time streamlining the amount of time and information entities must share with each other during funds transfer has effectively relegated experience in online electronic direct funds transfer to that of yesterday rather than the future. In particular, barcodes have been used in an effort to speed up the customer shopping experiences by providing merchant terminals information about the product when scanned through a checkout scanner, i.e. the price and brief description of the product that the barcode is attached/applied to. However, any use of barcodes outside of the customer shopping experience, other than as a look up service for a price of a product on a product by product basis, is simply not available.

At the same time, developments in the field of mobile commerce are being facilitated by improved functionality and features available on mobile devices, and by such functionality and features becoming more commonplace on current mobile devices. For example, cell phones, smart phones and tablet computers nowadays are commonly integrated, multi-functional devices. In addition to their core, basic functionality, they will often have, or can be configured to have, web-enabled functionality, various other communication capabilities (e.g., e-mail, text, wi-fi, etc.), camera functions, scanning and graphical image handling functionalities and other capabilities. Further, the ability of mobile devices to record and process images directly has not been fully leveraged by current state of the art transaction payment systems. Further, the ability of images to contain encoded information also has not been fully leveraged by current state of the art transaction payment systems.

SUMMARY

It is an object of the present invention to provide systems and methods to obviate or mitigate at least one of the above-presented disadvantages.

In the case of mobile payment systems in particular, there remains a need to provide for enhanced security by removing much of such payment processing functions away from the merchant POS Terminal. functionality and features becoming more commonplace on current mobile devices, however, the ability of mobile devices to record and process images directly has not been fully leveraged by current state of the art transaction payment systems and the ability of images to contain encoded information also has not been fully leveraged by current state of the art transaction payment systems.

Systems and methods for using a mobile device to facilitate a purchase directly from a TV screen, catalogue, an electronic billboard, poster or any type of electronic or print media, without having to place a phone call or manually browse to a website are disclosed herein. Furthermore systems and methods for using a mobile device, in an integrated manner, to facilitate registrations and/or purchases from a website are also disclosed herein. The embodiments disclosed here provide better solutions to the much sought-after mobile point of sale market which also opens up markets to mobile transaction processing that were never contemplated before—for example, the Electronic Media, Print Media, and e-commerce markets.

It is recognized that the TV screen, catalogue, an electronic billboard, poster or any type of electronic or print media can contain the ORMI (e.g. a barcode) or short code (e.g. code data) that can either be imaged (e.g. its picture taken in the case of the ORMI) or can be written down or memorized in the case of the short code (e.g. an alpha and/or numeric code that can be read by the consumer—e.g. "phoneoffer1x4"). It is also recognized that the short code can be communicated audibly to the consumer such as over the radio and thereby noted and subsequently used to initiate the transaction with the merchant rather than the mobile device scannable image (e.g. barcode).

It is also recognized that a short code can be used as a Payment Account Identifier of the consumer, rather than a picture bar code. In the case of the short code, this is communicated to the merchant by the consumer (e.g. sent in an email, verbally communicated, handwritten into a form, etc. to initiate the payment transaction related to the product purchased or otherwise acquired by the consumer from the merchant. The short code is unique and serves to uniquely identify the Consumer's Payment Account(s) when the data contained in the code data is communicated to a Payment Platform via the merchant's transaction interface. The Consumer's Payment Account may reside on a Payment Platform hosted by a financial institution, a credit issuing company, an E-wallet service provider, a money transfer service provider, or the like. The information on the Payment Account Identifier/barcode and the purchase transaction information is sent by the merchant transaction interface to the Payment Platform or intermediate transaction service via the Internet or a dedicated connection.

According to one aspect, a non-transitory computer readable storage medium with an executable payment application stored thereon, the payment application configured for generating a payment request for receipt by a merchant interface over a communications network, a transaction of the payment request associated with a merchant providing a product to a consumer, wherein the payment application instructs a computer processor to perform the following steps of: receiving a product code data, wherein the product code data is representative of merchant data associated with the product; receiving a consumer identifier, wherein the consumer identifier identifies the consumer; sending the payment request including the product code data and the consumer identifier to the merchant interface over the communications network; and receiving a confirmation of approval or denial of the payment request from a transaction interface that is separate and remote from the merchant interface over the communications network.

According to a further aspect, a transaction system for coordinating processing of a payment request associated with a transaction between a consumer and a merchant, the transaction associated with the merchant providing a product to the consumer, the system comprising: a computer processor coupled to a memory, wherein the computer processor is programmed to coordinate processing of the payment request by: receiving the payment request including merchant data, a consumer identifier, and a product code data; accessing a lookup database using the product code data to obtain transaction information related to the transaction request; using said consumer identifier to identify consumer payment account information; creating a transaction request using said merchant data, consumer payment account information and the transaction information; sending said transaction request to a payment platform; receiving approval of the transaction request from the payment platform in the event the payment account of the consumer has sufficient funds to cover an amount of the transaction; and sending a confirmation of the approval of the transaction request to the mobile device and to a computer device associated with the merchant.

BRIEF DESCRIPTION OF THE DRAWINGS

Features, aspects, and embodiments are described in conjunction with the attached drawings, by way of example only, in which.

DESCRIPTION OF VARIOUS EMBODIMENTS

Figure 1:
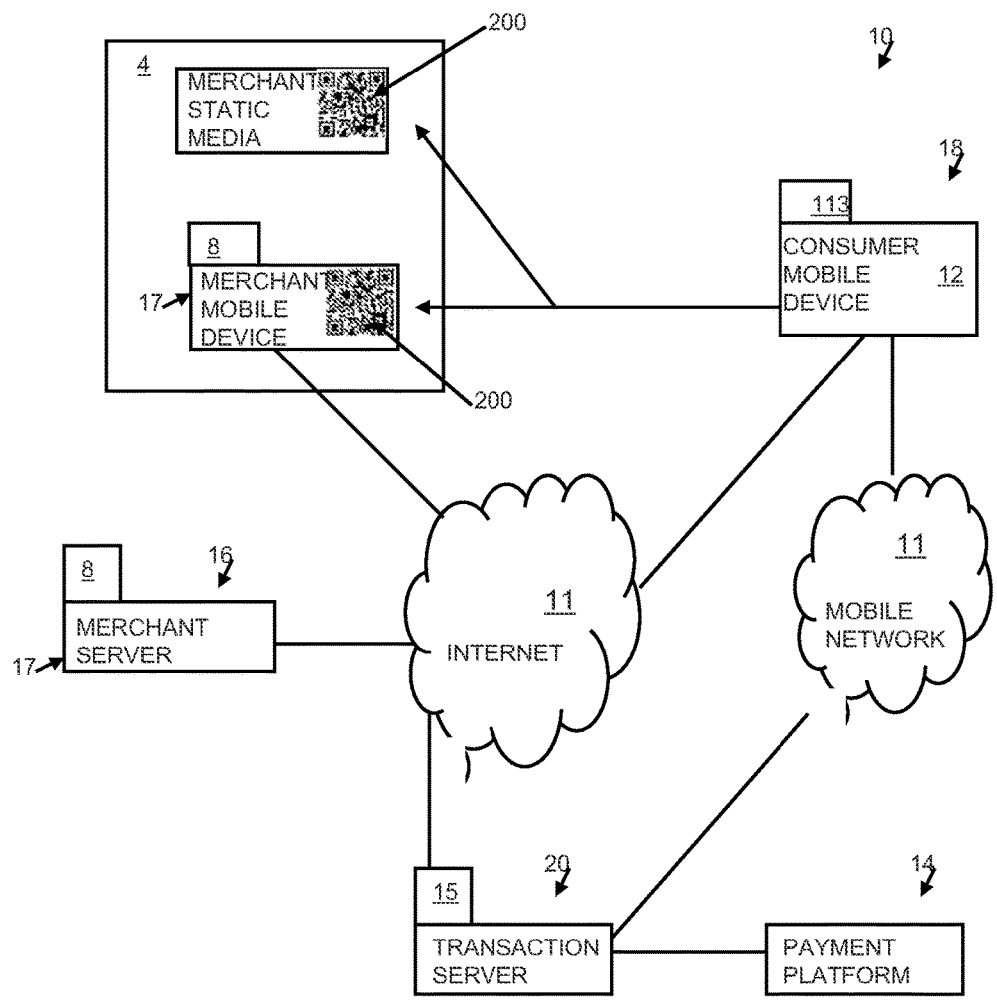
FIG. 1 is a simplified, schematic representation of the Mobile Image Payment System in operation, according to an embodiment, which illustrates the exemplary steps involved when a Consumer wishes to make a purchase with his/her mobile device using the payment system.
Figure 9:
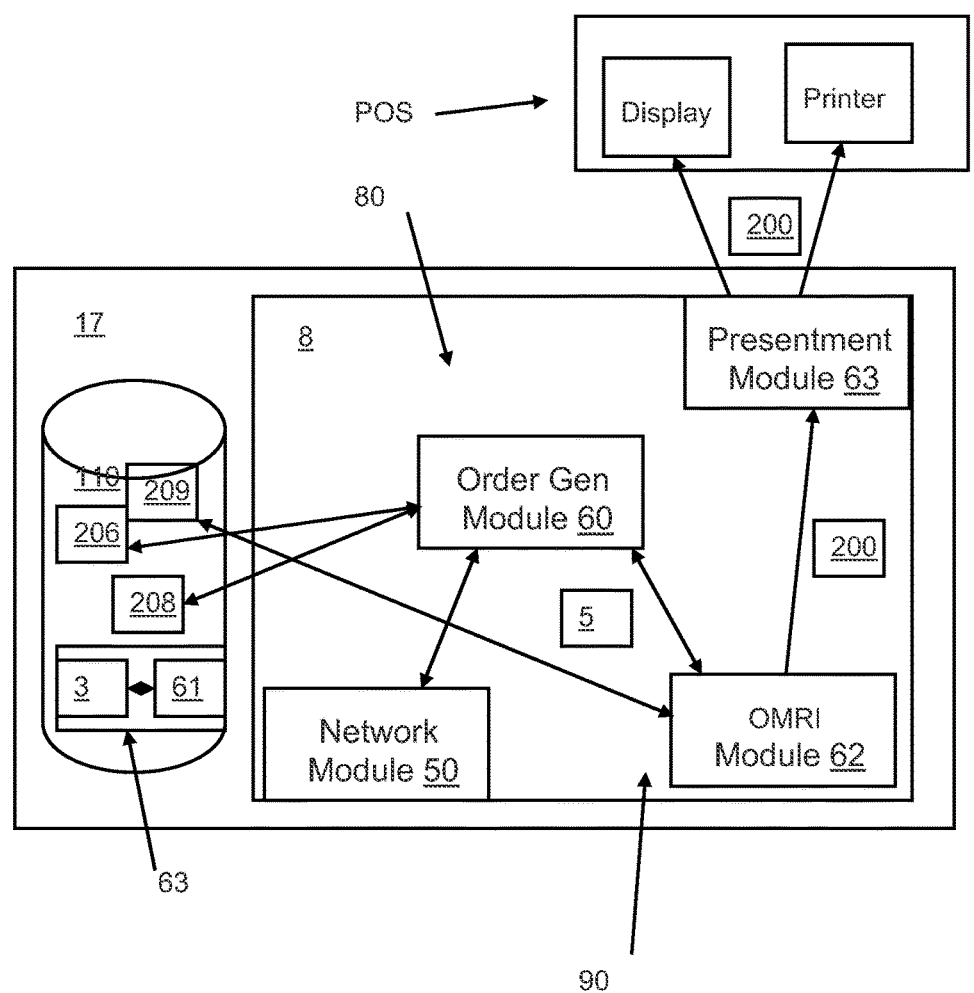
FIG. 9 is a block diagram of a merchant interface of FIG. 2.

Referring to FIGS. 1 and 9.

Consumer Code data 3—is a lookup or index identifier (ID) that is received by the merchant Point of Sale Terminal 17 (e.g. via a merchant application or interface 8) that can be subsequently provided to and used by a transaction service 20 to identify sensitive payment account information 61 of the consumer 18, as mapped in a lookup table 63. For example, the lookup identifier provided as the consumer code data 3 of "ABC123" could be received (via the merchant terminal 17) and used by the transaction service 20 to lookup from the lookup table 63 the actual consumer credit card number (or other sensitive financial account number 61). This actual financial account number would then be provided to and used by financial institutions of the payment processing system 14 to effect transfer of funds from the consumer financial payment account 72 identified by the financial account number 61 retrieved from the lookup table 63 using the consumer code data 3 as a lookup identifier. It is recognized that the consumer code data 3 can be included in the generated barcode 200 or can be provided to the merchant interface 8 (via the consumer 18) as an unencoded consumer code data 3 (i.e. unencoded textual information). The consumer code data 3 can be defined as a short code (e.g. a sequence of characters including numeric characters and/or alpha characters) that is also known to the transaction Service 20 as the consumer code data 3 used in identifying the actual payment account information 61 stored and accessible by the transaction interface 15. Therefore, after providing the consumer code data 3 as a series of numeric characters and/or alpha characters to the merchant application 8, the rest of the purchase transaction 5 process is exactly the same. One advantage in using the short code is that it works in situations where generating or otherwise scanning/processing the barcode 200 is not feasible by the merchant application 8 and/or the payment application 113.

Product Code data 3—can also be used as a replacement for the generated ORMI 200 as a product identifier (ID) that is received by the merchant Point of Sale Terminal 17 (e.g. via a merchant application or interface 8) to identify the product that the consumer 18 wishes to obtain from the merchant 16. The product code data 3 representing the product can be subsequently provided to and used by the transaction service 20 as a replacement/substitution to the ORMI 200. It is recognized that the product code data 3 can be included in the generated barcode 200 or can be provided to the merchant interface 8 (via the consumer 18) as an unencoded product code data 3 (i.e. unencoded textual information) instead of the barcode 200. The product code data 3 can be defined as a short code (e.g. a sequence of characters including numeric characters and/or alpha characters) that is also known to the transaction Service 20 and/or the merchant interface 8 as the product code data 3 used in identifying the product desired by the consumer 18. Therefore, after providing the product code data 3 as a series of numeric characters and/or alpha characters to the merchant application 8, the rest of the purchase transaction 5 process is similar instead of using the barcode 200. One advantage in using the short code is that it works in situations where generating or otherwise scanning/processing the barcode 200 is not feasible by the merchant application 8 and/or the payment application 113.

Payment Account Information 61—Sensitive information pertaining to the Payment Account 72, including but not limited to account holder's name, name of financial institution, account login information, account numbers, account balances, passwords and PIN numbers for accessing the account. It is recognized that the payment account information 61 is used by an payment processing system 14 to access and effect the actual transfer of funds from the identified account 72 of the consumer 18 from the payment account information 61. It is also recognized that, as further described below, the payment account information 61 is withheld from the point of sale terminal 17 of the merchant 16 and is instead communicated directly between the transaction Service Platform 20 and the consumer 18 and communicated directly between the transaction Service Platform 20 and the payment processing system 14.

Referring to FIG. 1, a Mobile Image Payment System 10 for mobile commerce enables a Consumer 18 to use a mobile device 12 to make payments for online, Electronic Media, Print Media, POS Transactions 5 and the like. The Consumer 18 may scan an encoded, mobile device scannable image 200 (e.g. optical machine readable image OMRI) that is displayed by a merchant 16, or provide the product code data 3, to initiate the transaction 5. A transaction service 20 via a transaction interface 15 can complete the transaction 5 by processing information between a Mobile Payment Client application 113 residing on the Consumer's mobile device 12, a Mobile Payment Interface 15 residing on a Transaction Server 6 (of the transaction service 20) and optionally a Mobile Payment Application or interface 8 residing on a merchant's device or POS terminal 17.

The present system 10 can be configured to provide the Consumer's mobile device 12 to communicate with the Payment Platform 14 and the Payment Platform 14 to communicate with the Merchant Transaction Server 17 in order to process and complete the mobile transaction 5. The merchant OMRI 200 or the product code data 3 can be displayed on any product or advertising medium (e.g., television screens, websites, print media, vending machines, points of sale terminals, etc.), opening up new sales and marketing opportunities for merchants, as encountered by the consumer 18 in the consumer environment 4 further described below.

One preferable aspect of the disclosed system and method is that the Consumer 18 may scan the OMRI 200 to initiate the transaction 5, as opposed to the prior art mobile commerce transaction approach where usually it is the merchant that scans an image to perform a transaction. The prior art approach necessitates the merchant having a relatively sophisticated device that is capable of scanning an image. Since "passive" media such as billboard, parking tickets, TV commercials, etc., are not capable of scanning, this prior art approach effectively eliminates most "passive" medium or devices from being used as a desirable part of a mobile transaction process.

The present system enables almost any object that can present the OMRI 200 or the product code data 3 to be used to initiate the mobile transaction 5. The transaction service 20 can provide consumers 18 with a consistent transaction 5 process regardless of where the transaction 5 originates (i.e., on the Internet, at a POS, on a television screen, on print media, etc.). After registering with the transaction service 20, the Consumer 18 can do the following to process the transaction 5: (1) Launch the application 113 on his/her mobile device 12; (2) Capture the OMRI 200 displayed by the merchant or otherwise not the product code data 3 displayed or otherwise audibly communicated (e.g. in the consumer environment 4); (3) Select the transaction 5 particulars (e.g., for a purchase, the Consumer 18 may select a preferred payment account 70,72 such as credit, debit, E-wallet, etc., where for an ATM machine transaction 5 the Consumer 18 may select a transaction type such as withdrawal, deposit, account balance, etc.; and for a restaurant transaction 5 the Consumer 18 can select the tip amount); (4) Confirm the transaction 5; and (5) Optionally, confirm that order fulfillment information can be automatically provided to the merchant 16 by the transaction service 20. The backend fulfillment process can be handled by the transaction service 20 (e.g., delivery/pickup instructions, payment processing, etc.).

The merchant 16 can register with the transaction service 20 by providing merchant data 208 to a registration module 60 and create a merchant profile 117 stored in the storage 110. For example, the merchant profile 117 can contain the specifics (i.e. merchant parameters) of the products they are offering, as well as configured (e.g. the merchant can update their own profile details 117) to include profile specifics such as but not limited to whether or not they deliver, deliver charges, whether or not a tip is required etc. It is recognized that the merchant profile 117 parameters are used to define the transaction 5 associated with OMRI 200 or the product code data 3 that are used by or otherwise requested from the transaction service 20. It is also recognized that the merchant parameters of the merchant profile 117 can include financial account information of the merchant 16 (e.g. bank account numbers, PIN numbers, etc.).

The consumer can install the transaction application 113 on his/her computer device 12 and optionally register with the transaction service 20 by providing consumer data 211 to the registration module 60 and create a consumer profile 117 stored in the storage 110. For example, the consumer profile 117 can contain the specifics (i.e. consumer parameters) of the consumer 18 (e.g. consumer address, financial account information, etc., as well as configured (e.g. the consumer can update their own profile details 117) to include profile specifics such as but not limited to what transactions 5 are authorized (or not authorized—i.e. prohibited) by the consumer 18, maximum transaction amounts for one or more of the transaction types, etc. It is recognised that the consumer profile 117 parameters can be used to influence the transaction 5 associated with the OMRI 200 or the product code data 3 that are used by or otherwise requested from the transaction service 20, from the consumer environment 4, and/or directly from the merchant 16. It is recognized that the product code data 3, the ORMI 200, or a combination thereof can be used to initiate the transaction 5 as further described below.

Transaction Service 20 Applications in E-Commerce

Disclosed herein is a system (sometimes referred to as a Mobile Image Processing System or transaction service 20) that marries mobile commerce with e-commerce in ways never anticipated before while simultaneously addressing two of the most persistent issues in e-commerce: shopper confidence and abandoned sales.

The conventional industry approach to marrying mobile commerce and e-commerce has been to make mobile devices web capable. This is to say that the general trend in the technology industry has been to develop technologies that allow a Consumer to browse and shop from websites via his/her mobile device. A standard e-commerce purchase allows a Consumer to use a personal computer to access the Internet, browse to a website, shop online, fill out any forms that the merchant needs to complete the transaction and finally pay for the purchase online. The embodiments disclosed herein make a mobile device complementary to a standard e-commerce purchase. This is done by providing the Consumer 18 to use the transaction service 20 to facilitate the payment and form fill out components of the online transaction 5.

In addition, as previously mentioned, some Consumers are reluctant or unwilling to shop online due to real and perceived security concerns associated with exposing personal Payment Account (e.g. accounts 70,72) information online. The embodiments disclosed herein can provide Consumers 18 the ability to pay for online purchases by interacting with the transaction 5 via his/her mobile device 12, without the Consumer 18 exposing his/her Payment Account 70,72 information online on a transaction per transaction basis. In addition, the transaction service 20 can expedite the checkout procedure by auto-populating any online forms (of the merchant 16) that need to be filled out as part of the online purchase process associated with the transaction 5.

Embodiment of Mobile Image Payment System 10

Figure 2:
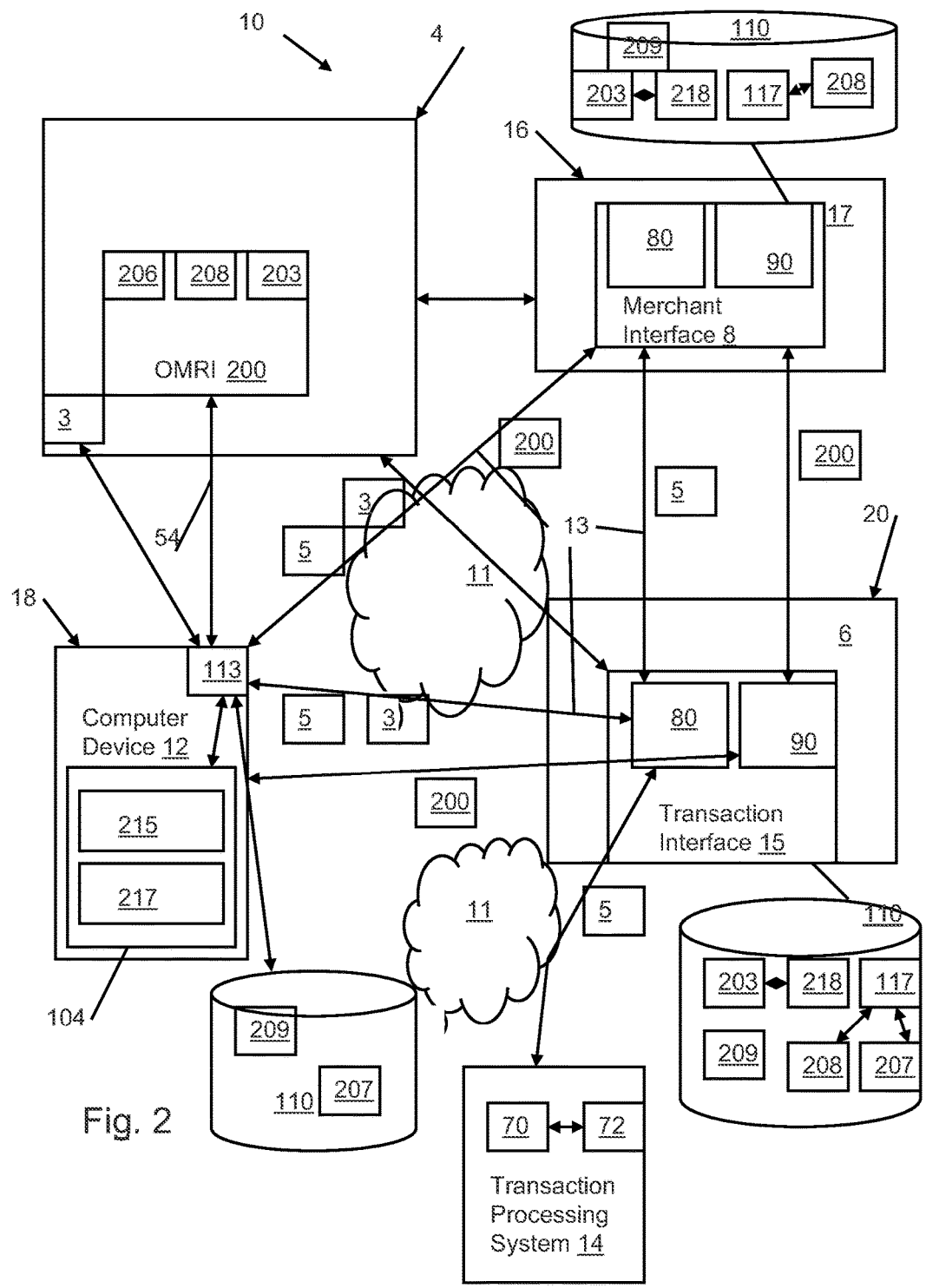
FIG. 2 is a block diagram of components of a transaction processing system as a further embodiment of FIG. 1.
Figure 4:
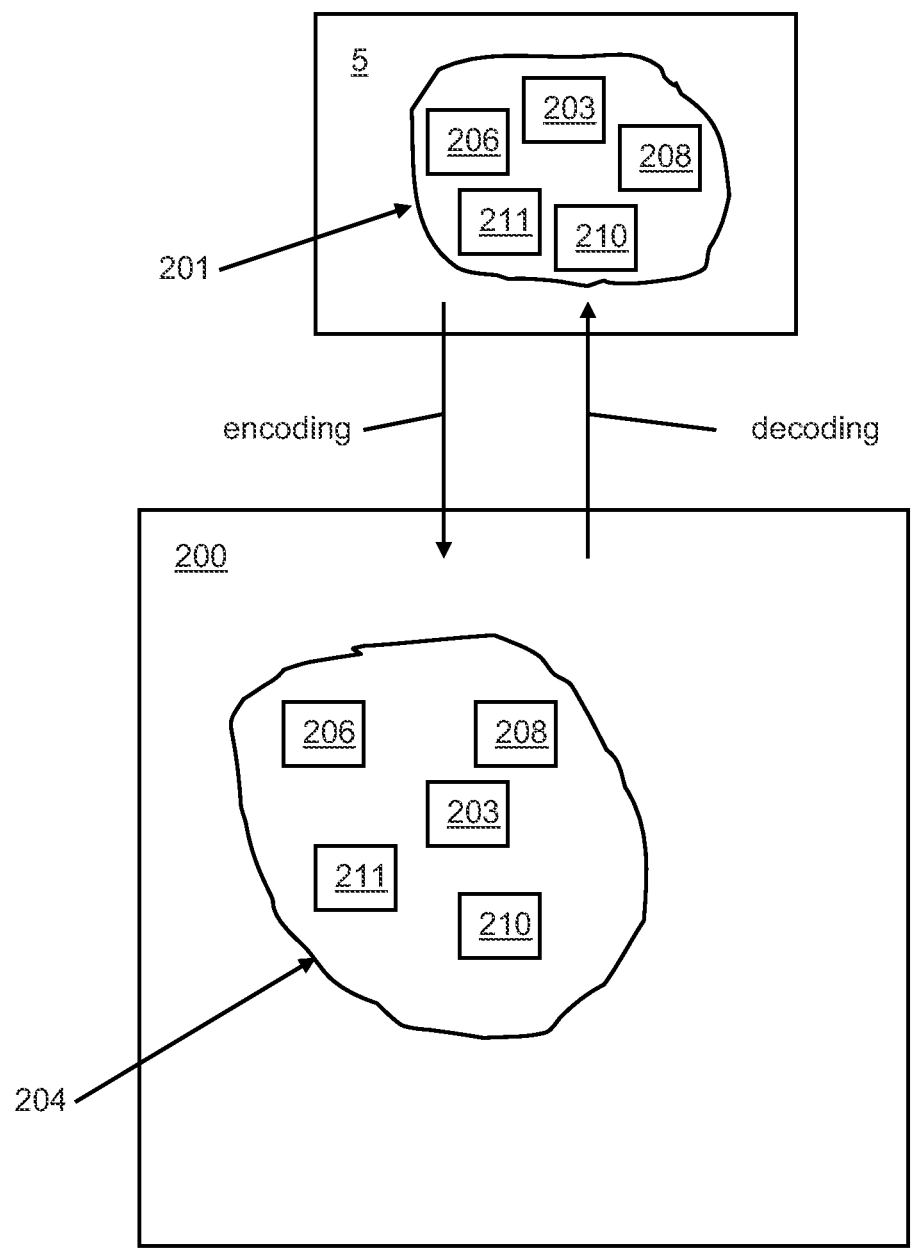
FIG. 4 shows example encoded and unencoded information for the system of FIG. 2.

Referring to FIG. 2, shown is the Mobile Image Payment System or environment 10 that includes the consumer environment 4 from which the consumer 18 encounters the OMRI 200 or the product code data 3 and interacts with the OMRI 200 or the product code data 3 using their computer device 12 (e.g. desktop computer, mobile device, etc.) via the transaction application 113. The environment 10 also has the merchant 16 operating their computer device 17 (e.g. a merchant computer system including one or more servers, one or more desktop computers, one or more point of sale (POS) terminals, and/or one or more mobile devices), who requests generation of the OMRI 200 or the product code data 3 (see FIG. 4) to include product data 206, merchant data 208 and/or transaction data 203 (further described below) from the transaction service 20. The merchant 16 can make the OMRI 200 or the product code data 3 available in the consumer environment 4 for subsequent access by the consumer 18 and/or can send the OMRI 200 or the product code data 3 directly to the computer device 12 of the consumer 18 via the communications network 11. The merchant 16 can also instruct the transaction service 20 to send the OMRI 200 or the product code data 3 directly to the computer device 12 of the consumer 18 via the communications network 11.

The communications network 11 can be one or more networks, for example such as but not limited to: the Internet; an extranet; and/or an intranet. Further, the communications network 11 can be a wired or wireless network. It is also recognized that network 11 messages (between the various devices 6, 12, 17 and a transaction system 14) can be communicated via short range wireless communication protocols such as but not limited to Bluetooth™, infrared (IR), radio frequency (RF), near field communication (NFC) and/or by long range communication protocols (e.g. HTTP, HTTPS, etc.), in view of the type of electronic communication required between any pair of devices 6, 12, 17 and the system 14. For example, the devices 12,17 could communicate with one another using short range Bluetooth™ communications while the devices 6,12 or 6,17 could communicate with one another using long range HTTP or HTTPS based communications.

Further, the transaction service 20 can communicate also via the communications network 11 with the transaction processing system 14 that performs the settlement (e.g. debit of funds specified in the transaction 5 from a financial account of the consumer 18 and crediting of the funds in to a financial account of the merchant 16) of any required funds transfer in the transaction 5 between the financial accounts 70, 72 (e.g. the merchant account 72 and the consumer account 70). It is recognized that the actual amount of debit and credit funds actions performed by the transaction processing system 14 may not exactly match a payment amount specified in the transaction 5, as embodied in the OMRI 200 or the product code data 3, due to applied service charges. For example, a payment request of $5 from the financial account 72 to the financial account 70 could result in an actual debited amount of $5.02 (representing an included $0.02 service charge to the consumer 18) and/or an actual credited amount of $4.98 (representing an included $0.02 service charge to the merchant 16). Therefore, it is anticipated that processing of the electronic funds transfer of the transaction 5 can involve a transaction service charge (optional) being charged to the merchant 16 and/or the consumer 18 in order to complete the funds transfer of the transaction 5 that was initiated through accessing by the consumer 18 of the OMRI 200 or the product code data 3 from the environment 4 and/or initiated by generating of the OMRI 200 or the product code data 3 and sending of the OMRI 200 or the product code data 3 (either by the merchant 16 or by the transaction service 20) to the computer device 12 of the consumer 18.

Transaction 5 settlement can be defined as where the payment amount (i.e. optional financial component of the transaction 5) is transferred (via the transaction processing system 14) from the one account 70 to the other account 72, i.e. the credit and debit transactions of the payment amount against the respective accounts 70,72 are either performed (e.g. in real time) or promised to be performed (e.g. included in a batch transaction to be performed later in the day or following business day).

It is recognized that network 11 communication messages facilitating the processing of the transaction 5 are preferably between each of the transaction application 113 and the merchant interface 8 and the transaction interface 15 directly, rather than directly between the transaction application 113 and the merchant interface 8 themselves (i.e. directly meaning without interaction with the transaction interface 15). Therefore, in one embodiment, in the event that the transaction application 113 and the merchant interface 8 need (e.g. request) information from one another, these request (and response) network 11 messages would go through the transaction interface 15 acting as an intermediary network interface between the transaction application 113 and the merchant interface 8. However, it is recognized that network 11 messaging directly between the transaction application 113 and the merchant interface 8 can also be configured, for example for the purpose of gathering information relevant to generation and/or processing of the transaction 5 as desired.

The transaction service 20 has the transaction interface 15 including a transaction processing system 80 and an OMRI or the product code data 3 processing (e.g. generation and/or decoding) system 90 (further described below), such that the system 90 generates or otherwise decodes the OMRI 200 or the product code data 3 for the merchant 16 (or directly for the consumer 18) and the system 80 interacts with the merchant 16 and the consumer 18 to process the transaction 5 there-between upon receipt of the OMRI 200 or the product code data 3 (and/or information obtained from the OMRI 200 or the product code data 3 from the transaction application 113 provisioned on the computer device 12) from the consumer 18.

Therefore, the transaction service 20 is implemented on the computer device 6 (e.g. a web server) and communicates over the communications network 11 with the computer devices 17,12 via a hosted transaction interface 15. The transaction interface 15 of the transaction service 20 can be a web site accessible over the communications network 11 by the computer devices 17,12 using respective web browsers operating on the computer devices 17,12, such that the transaction interface 15 is in communication with the transaction application 113 and the merchant interface 8. Accordingly, the transaction interface 15, computer device 12 and computer device 17 can interact (e.g. via network 11 messages) together to initiate and complete the transaction 5, for example based on products offered and sold by the merchant 16 to the consumer 18, such that the OMRI 200 or the product code data 3 (see FIG. 4) is generated and included as part of the initiation and/or processing of the transaction 5 in conjunction with the transaction interface 15.

Consumer Environment 4

Figure 3:
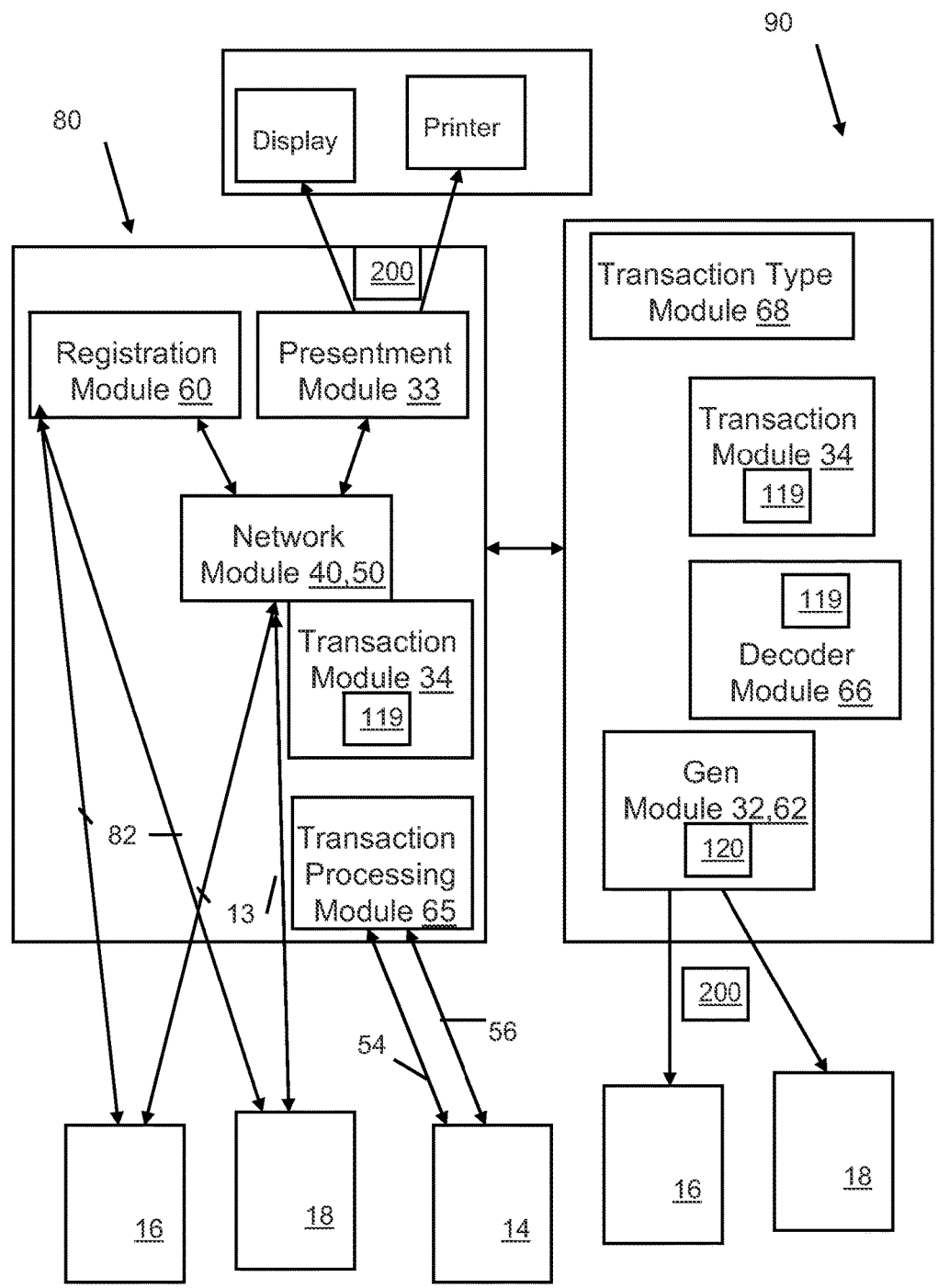
FIG. 3 is a block diagram of an example transaction processing system configuration and an example OMRI processing system configuration of the system of FIG. 2.

Referring to FIGS. 2 and 3, the consumer environment 4 is defined as the environment in which the consumer 18 can come into contact with the OMRI 200 or the product code data 3. It is recognized that the OMRI 200 or the product code data 3 can be obtained by the computer device 12 through an electronic network message 54 (e.g. sent directly or indirectly from the merchant 16 via the environment 4) containing an image of the OMRI 200 or the product code data 3 and/or can be obtained using an imager 118 (e.g. a camera—see FIG. 6) operated through the computer device 12 in order to capture an image of the OMRI 200 or the product code data 3 in range of the imager 118. In terms of electronic messages 54 containing an image of the OMRI 200 or the product code data 3, these can be messages such as but not limited to: email messages; browser based messages obtained via interaction with a website (e.g. merchant website, affiliated merchant website, product advertising website, etc.); and/or other network 11 communication messages. In terms of a media displayed image of the OMRI 200 or the product code data 3, the media used can be printed media such as but not limited to: magazines; newspapers; clothing; billboards; barcode labels; etc. In other words, printed media used as a source of the OMRI 200 or the product code data 3 can be any physical substrate (e.g. paper, cloth, plastic, etc.) upon which the OMRI 200 or the product code data 3 is printed, formed, or otherwise embossed. In terms of electronic media used to display the image of the OMRI 200 or the product code data 3, the electronic media can be such as but not limited to: electronic billboards; computer displays of the merchant computer systems such as point of sale terminals; displays of the consumer 18 such as desktop computers; television screens; and any other computer display adjacent to and in range of the imager 118 of the computer device 12. It is also recognized that the product code data 3 can be communicated audibly (e.g. over the radio or other audio based advertisement) to the consumer 18.

One example of the consumer environment 4 is where the computer device 12 receives a network message 54 containing an image of the OMRI 200 or the product code data 3 that is displayed on the user interface 104 (see FIG. 6) of the computer device 12. In this example, the network message 54 can be an order screen sent from a merchant order interface 8 (of a merchant website) operated by the merchant computer device 17. The consumer 18 can select the OMRI 200 or the product code data 3 image on their user interface 104 using a cursor or touch screen functionality of the computer device 12 and then use the transaction application 113 to coordinate subsequent transaction 5 processing via the processing system 80 of the transaction service 20 and/or via merchant interface 8 of the merchant device 17.

A further example is where the consumer 18 is at a POS terminal (e.g. computer device 17) of the merchant 16, for example during purchase of retail products. The consumer 18 would use the imager 118 of the computer device 12 to capture an image of the OMRI 200 or the product code data 3, which could be displayed in printed form (e.g. on a paper order form) and/or on a computer display (e.g. of the POS). The consumer 18 could then use the transaction application 113 to coordinate subsequent transaction 5 processing via the processing system 80 of the transaction service 20 and/or via merchant interface 8 of the merchant device 17.

Therefore, as discussed below, the computer device 12 does not necessarily have to communicate electronically with the transaction interface 15 or the merchant interface 8 in order to receive the OMRI 200 or the product code data 3, Instead, the OMRI 200 or the product code data 3 can be presented to the consumer 18 on a merchant display screen and/or on printed label at a merchant physical retail location. In this manner, the consumer 18 can record an image of the OMRI 200 or the product code data 3 by using the imager 118 of the computer device 12 (e.g. a camera enabled mobile device), for subsequent processing by the computer device 12 and the transaction service 20. Alternatively, the consumer 18 can note the product code data 3 and then enter it via the user interface of their computer device 12. Alternatively, the computer device 12 can use optical character recognition on an image of the product code data 3 in order to recognize the product code data 3 and provide it to the merchant interface 8 (e.g. via the application 113).

Definition of Products

In economics, economic output is divided into goods and services. When an economic activity yields a valuable or useful thing, it can be known as production output of the totality of products (e.g. goods or services) in an economy that the merchant 16 makes available for use by the consumers 18. Products as goods can range from a simple safety pin, food, clothing, computer components to complex machinery and electronic or physical media (physical or electronic versions of music, print media, etc.). Products as services are the performance of any duties or work for another (e.g. helpful or professional activity) and can be used to define intangible specialized economic activities such as but not limited to: providing access to specific information; web services; transport; banking; legal advice; accounting advice; management consultant advice; and medical services. The merchant 16 providing the products can be a businessperson or individual engaged in wholesale/retail trade, an organization, an administration, and/or a business that sells, administers, maintains, charges for or otherwise makes available product(s) that are desirable by the consumers 18. Therefore, it is recognized that the products may be made available to the consumer 18 for purchase and/or for free. One example of a "free" product is a trial subscription to a web service.

Accordingly, the merchant 16 can be one person, or an association of persons, for the purpose of carrying on some enterprise or business; a corporation; a firm; etc. Further, it is recognised that the products can be related to company activities not related to specific product(s), for example consumer service, community activities, donations, and/or sponsorships. These general activities of the merchant 16 are also considered as part of the definition of merchant 16 products.

As further discussed, the merchant products are offered (e.g. for sale) using the OMRI 200 or the product code data 3 (e.g. accessed via an online interface and/or image captured) that is made accessible by the consumer 18. for example, The merchant interface 8 provides the consumer 18 with the ability to select and/or specify a plurality of desired products for purchase (or without purchase and just as a registration or subscription not requiring payment as part of the transaction 5) and also provides the OMRI 200 or the product code data 3 to the merchant interface 8 (see FIG. 4) that contains encoded product information and merchant information (symbology information 204, in the case of the ORMI 204) representing summary information (e.g. product listing, total purchase price, merchant profile information, etc.) of the products, e.g. one OMRI representing product and merchant data for two or more products. In any event, it is recognized that the OMRI 200 or the product code data 3 is received by the transaction application 113 of the computer device 12 to contain data (e.g. product data 206, merchant data 208, and/or other transaction data 210) pertaining to one or more products, optionally including payment transaction data needed by the transaction processing system 14 to settle financial elements of the transaction 5 (optionally involving financial details).

The OMRI 200 (i.e. an optical machine-readable representation of data) of the payment transfer transaction 5 contains symbology information 204 in encoded form based on a coding scheme 209. One example of the OMRI 200 is a barcode, such that the coding scheme 209 is a barcode coding scheme for use in encoding and decoding of the symbology information 204 of the barcode. Another example of the OMRI 200 is a dataglyph, such that the coding scheme 209 is a dataglyph coding scheme for use in encoding and decoding of the symbology information 204 of the dataglyph.

It is recognized that the merchant 16 products can include restaurant meals (and/or service), such that the OMRI 200 or the product code data 3 represents a meal bill and the products are individual food and/or beverage items. It is also recognized that the merchant 16 products can be groceries or other retail items being paid for in person by the consumer 18 at the merchant retail establishment, for example. It is also recognized that the products in a rental or professional services context including a duration of the time the services were performed.

OMRI 200 and Code Data 3

Referring again to FIG. 4, as used herein, the term OMRI 200 (e.g. barcode, dataglyph, etc.) refers to an optical machine-readable representation of encoded information or data, presented as an ordered pattern of symbols (i.e. symbology information 204). For example, barcodes can encode information in the widths and the spacing of parallel lines, and may be referred to as linear or 1D (1 dimensional) symbologies. Barcodes can also encode information in patterns of squares, dots, hexagons and other geometric shapes or symbols within images termed 2D (2 dimensional) matrix codes or symbologies. Typically, although 2D systems use symbols other than bars, they are generally referred to as barcodes as well. Accordingly, barcode images discussed herein for use with a barcode scanner or decoder can refer to either 1D or 2D barcodes. With conventional monochromatic barcodes, features are typically printed in black on a white background, thereby forming a pattern that is used to form the machine-readable representation of transaction information of the transaction 5. With color barcodes, the pattern can include any number of colors (typically also including black and white) distinguishable from one another during the barcode decoding process.

The OMRI 200 is generated to include symbology information 204 representing merchant and product content used, for example, to help define product and payment or other transaction terms/details concerning the product(s) made available to the consumer 18 by the merchant 16. As discussed further below, the OMRI 200 can be electronically displayed (e.g. on a computer display), can be provided as graphic content (e.g. an image file such as but not limited to a GIF or JPEG) in a network message 54) and/or can be provided in printed form (e.g. presented on a physical medium such as paper or plastic—for example associated with a picture in a magazine or present on a label). As discussed, interaction between the OMRI 200 or the product code data 3 and the consumer 18 placing the order for the product(s) can include consumer 18 actions such as but not limited to: selection (e.g. via mouse or other pointer) on the user interface 104 of the consumer device 12 displaying the OMRI 200 or the product code data 3; receiving the image file containing the OMRI 200 or the product code data 3; and/or recording/capturing the image of the OMRI 200 or the product code data 3 using the imager 118 (e.g. camera) (see FIG. 6) of the computer device 12 (e.g. mobile device), such that the OMRI 200 or the product code data 3 is displayed on physical media and/or electronic media (i.e. an electronic display adjacent to the consumer device 12 and in-range of the imager 118). Example environments of the described image capture process would be where the OMRI 200 or the product code data 3 is displayed on a desktop computer of the consumer 18 or on a computer terminal (part of the transaction interface 8) of the merchant 16. It is also recognized that the consumer 18 can input the product code data 3 as text input via the user interface of their computer device 12.

In terms of the symbology information 204 of the OMRI 200, the symbology information 204 includes a plurality of symbols (i.e. graphical elements) that, as a collection of symbols or patterns (e.g. an organized collection of symbols forms a legend, or key), represents encoded transaction information that is distinct from the actual unencoded merchant and product information 201 itself. For example, a graphical element (of the symbology 204) of a black line of a specific width represents a textual element (of the textual information 201) as the number six, while a different width represents a different textual element (of the textual information 201) such as the number two. It is recognized that graphical elements can be pictures (e.g. images) of text elements and/or of non-text elements. For example, the graphical element "6" (e.g. encoded or symbology information 204) in the coding scheme 209 could be mapped to a product code "1234" (e.g. unencoded information 201). In another example, the graphical element "(*)" (e.g. encoded or symbology information 204) in the coding scheme 209 could be mapped to a product code "1234" (e.g. unencoded information 201).

The purpose of the symbology information 204 is to communicate encoded invoice information (that defines a plurality of invoice parameters) as readable (e.g. decodable)

by an image decoder. The decoder could be present on the consumer device 12 and/or on the transaction service 20, as further described below. It is recognized that mapping (i.e. processing performed by the decoder or encoder) between the symbology information 204 and the unencoded merchant and product information 201 is what enables the OMRI 200 to be generated and interpreted. A specification of the symbology information 204 can include the encoding of the single digits/characters of the textual merchant and product information 201 as well as the start and stop markers into individual symbols (e.g. bars) and space between the symbols of the symbol collection/pattern, the size of a quiet zone required to be before and after the OMRI 200, as well as a computation of a checksum incorporated into the OMRI 200 for error checking purposes as is known in the art.

It is recognized that the OMRI 200 may not contain descriptive data, rather the OMRI 200 can be used as containing reference codes (e.g. decoded OMRI information) that a computer uses to look up an associated record that contains the descriptive textual merchant and product information 201, as well as any other relevant information about the products or items associated with the transaction 5 encoded in the OMRI 200. For example, the matching item record of the symbology information 204 can contain a description of the product, vendor name, product price, quantity-on-hand, etc., including any of the product data 206, merchant data 208, consumer data 211, and/or transaction data 210 (e.g. transaction type) as further described below. However, some OMRIs 200 can contain, besides reference ID, additional or supplemental information such as product name or manufacturer, for example, and some 2D OMRI 200 may contain even more information as they can be more informationally dense due the greater variation potential of the printed patterns over those of 1D OMRI 200.

In terms of the product code 3, it is recognized that the product code data 3 may not contain descriptive data, rather the product code data 3 can be used as a reference or lookup identifier that a computer uses to look up an associated record that contains the descriptive textual merchant and product information 201, as well as any other relevant information about the products or items associated with the transaction 5 represented by the product code data 3. For example, the matching item record of the product code data 3 can contain a description of the product, vendor name, product price, quantity-on-hand, etc., including any of the product data 206, merchant data 208, consumer data 211, and/or transaction data 210 (e.g. transaction type) as further described below. However, some the product codes data 3 can be referenced or otherwise associated with, besides reference ID, additional or supplemental information such as product name or manufacturer.

In terms of different barcode type, linear symbologies (e.g. UPC barcodes as an example symbology format of the OMRI 200) can be classified mainly by two properties, continuous vs. discrete and two-width vs. many-width. In continuous vs. discrete, characters (i.e. representing the merchant and product information 201 content) in continuous symbologies usually abut, with one character ending with a space and the next beginning with a bar (e.g. light-dark patterns), or vice versa. Characters (i.e. representing textual merchant and product information 201 content) in discrete symbologies begin and end with bars and any intercharacter space is ignored as long as it is not wide enough to look like the code ends. In two-width vs. many-width, bars and spaces in two-width symbologies are wide or narrow, and the exact width of a wide bar has no significance as long as the symbology requirements for wide bars are adhered to (usually two to three times wider than a narrow bar). Bars and spaces in many-width symbologies are all multiples of a basic width called the module, wherein most such codes use four widths of 1, 2, 3 and 4 modules. Some linear symbologies use interleaving, such that the first character (i.e. representing the textual merchant and product information 201 content) is encoded using black bars of varying width. The second character (i.e. representing the invoice data content) is then encoded, by varying the width of the white spaces between these bars. Thus characters (i.e. representing the invoice data content) are encoded in pairs over the same section of the barcode. Stacked symbologies repeat a given linear symbology vertically.

In terms of multidimensional symbologies (e.g. 2D, 3D, etc.), the most common among the many 2D symbologies are matrix codes, which feature square or dot-shaped modules (i.e. representing the merchant and product information 201 content) arranged on a grid pattern. 2-D symbologies also come in circular and other patterns and may employ steganography, thereby hiding modules within an image (for example, using DataGlyphs). Aztec Code is another type of 2D barcode.

Quick Response Codes (QRC) is another a type of matrix barcode (or two-dimensional code) providing faster readability and larger storage capacity compared to traditional UPC barcodes. The QR code (as an example symbology format of the OMRI 200) consists of black modules arranged in a square pattern on a white background. The information encoded can be made up of four standardized kinds ("modes") of encoded data (e.g. numeric, alphanumeric, byte/binary, and/or Kanji), or by supported extensions virtually any kind of data.

It is also recognized that the symbology information 204 of the OMRI 200 can include custom graphical elements (as codified in the coding scheme 209) involving combinations of one or more graphical elements used to represent a textual element, e.g. a corporate logo is used as a collection of graphical elements (e.g. circle, square, and company name) that is mapped (e.g. decoded) by the coding scheme 209 to represent a textual element (e.g. a URL to a webpage of the company website). Alternatively, the textual element can be mapped (e.g. encoded) by the coding scheme 209 to represent the collection of graphical elements. In this example, the graphical element of a company name (the symbology information 204) is decoded by the coding scheme 209 to represent the text of the URL (the unencoded information 201). One example of barcodes containing custom graphical elements is Microsoft™ Tag barcodes.

Microsoft™ Tags as an OMRI 200 are another type of barcode, e.g. 2D barcodes, which offer more flexibility than traditional barcode formats both in the barcode design and the content behind it. Because Microsoft Tag barcodes can be linked to data stored on a server, you can deliver a more robust online experience—including entire mobile sites— and update the content any time without having to change the Microsoft Tag. So, if you link a Microsoft Tag on your business card to your résumé, it will still be valid after you get that big promotion. Microsoft Tags can be black-and-white or full-color, including custom images (e.g., a company logo). Therefore, the Microsoft Tag can have encoded data in the symbology information 204 of the Tag that includes a link (e.g. URL) or other hyperlink that references a location in memory (e.g. in a database) and/or a network address where data content is available/accessible via the encoded link. In other words, a Tag encoder would use a Tag coding scheme 209 to encode the textual link information 201 into corresponding symbology information 204, e.g. the hyperlink to a website (the textual link information 201) would be represented as one or more graphical elements such as a company logo or even graphical elements (the symbology information 204) picturing the product itself.

It is also recognized that the symbology information 204 of the OMRI 200 can be encrypted (e.g. using a DES algorithm). In terms of the format of the symbology information 204, codewords embedded/encoded in the symbology information 204 are typically 8 bits long. It is recognized that the transaction 5 data represented by the symbology information 204 in the OMRI 200 can be broken up into multiple blocks, such that each block includes a number (e.g. 255) of codewords in length.

Another example of an optical machine-readable (e.g. OMRI 200) representation of encoded information or data are DataGlyphs, which are a new technology for encoding machine readable data onto paper documents or other physical media. They encode information into a number of tiny, individual glyph elements. Each graphical (e.g. glyph) element can consist of a small 45 degree diagonal line as short as 1/100th of an inch or less, depending on the resolution of the printing and scanning that is used, for example. Each glyph element (as the symbology information 204) represents a single binary 0 or 1 (as the decoded textual information 201), depending on whether it slopes to the left or right. Sequences of these glyph elements (symbology information 204) can be used to encode numeric, textual or other information (unencoded information 201).

As an example configuration of the dataglyph symbology and coding scheme 209, the individual glyphs are grouped together on the page (or displayed electronically on a display), where they form unobtrusive, evenly textured gray areas, like half-toned pictures. One of the reasons for using diagonal glyph elements is because research has shown that the patterns that they form when massed together are not visually distracting. DataGlyph technology allows ordinary business documents to carry thousands of characters of information hidden in these unobtrusive gray patterns that can appear as backgrounds, shading patterns or conventional graphic design elements. Often, their presence will go completely unnoticed. (The entire Gettysburg Address will fit in a DataGlyph about the size of a small US postage stamp). DataGlyph areas can be printed on a document as part of its normal printing process or displayed on a screen as part of the normal image rendering process. The information to be put in the DataGlyphs is encoded as a sequence of individual glyphs, and these can be printed either directly by the encoding software (for instance, by computer laser printer) or via a conventional printing process, such as offset. The glyphs are laid down on a finely spaced rectangular grid so that the area is evenly textured. In addition, each glyph area contains an embedded synchronization lattice or "skeleton"—a repeating, fixed pattern of glyphs which marks the boundaries of the glyph area and serves as a clocking track to improve the reliability of reading. Before data is placed into the synchronization frame, it's grouped into blocks of a few dozen bytes and error correcting code is added to each block. The amount of error correction to be used is chosen by the application, depending on the expected quality of the print-scan cycle. Higher levels of error correction increase the size of the glyph area needed for a given amount of data, but improve the reliability with which the data can be read back. This can be very important in environments where there's a high level of image noise (for example, fax) or where the documents are subjected to rough handling. As a final step, the bytes of data are randomly dispersed across the glyph area, so that if any part of the glyph area on the paper is severely damaged, the damage to any individual block of data will be slight, and thus easy for the error correcting code to recover. Together, error correction and randomization provide very high levels of reliability, even when the glyph area is impaired by ink marks, staples and other kinds of image damage.

In view of the above description, it is recognized that OMRI 200 can be embodied as barcodes, dataglyphs or other images that contain encoded symbology information 204 that can be decoded into unencoded information 201 (e.g. textual elements) using an appropriate coding scheme 209 that provides a mapping (e.g. rules) between the symbology information 204 to into the unencoded information 201 (e.g. the decoding process) and the unencoded information 201 into the symbology information 204 (e.g. the encoding process). In any event, the following description, for simplified example explanation purposes only, refers to OMRI 200 as barcodes 200. However, it is recognized that in the below description, the term barcode 200 can be interchanged with the broader meaning of OMRI 200, as desired.

In view of the above, it is recognized that there can be a variety of different OMRI 200 encoded for different transaction types. For example, the transaction type 203 assigned to the OMRI 200 will determine what portion of the functionality of the transaction application 113 is used by the consumer 18, and/or provided by the transaction interface 15 or merchant interface 8, to facilitate processing of the transaction 5 associated with the OMRI 200.

In view of the above, it is recognized that there can be a variety of different product code data 3 for different transaction types. For example, the transaction type 203 assigned to the product code data 3 will determine what portion of the functionality of the transaction application 113 is used by the consumer 18, and/or provided by the transaction interface 15 or merchant interface 8, to facilitate processing of the transaction 5 associated with the product code data 3.

PIN

The PIN can be defined as a secret numeric (however can also include alpha or other non-numeric characters) password shared between the cardholder (e.g. consumer 18) and system 10, for use in authentication of the cardholder to the system 10.

Historically, a payment card was inserted physically into the POS terminal and the PIN entered by the cardholder using a keypad of the merchant terminal. This traditional verification was enabled by using a physical credit card payment terminal or point-of-sale (POS) system with a communications link to the merchant's acquiring bank. However fraudulent activity (such as reading and copying PIN information) by unscrupulous merchants (e.g. "eavesdroppers", "man in the middle attackers") remains a concern. Further, in the case of online payments, a physical POS terminal is simply not available.

Therefore, to help technically address the above noted prior art technical deficiencies, in operation of the payment application 113 configured computer device 12, the PIN can be entered via the user interface 104 of the computer device 12 and thereby included (e.g. in encrypted form) in the payment request. For example, the PIN can be sent encoded by using the encoding scheme 209 of the OMRI 200 or can be represented as the consumer code data 3, such that the payment application 113 would use the appropriate encoder configured for using the encoding scheme 209. The cardholder is granted access to their account 70,72 when the PIN entered matches with the stored PIN as held by the transaction interface 15 and/or the payment platform 14. In particular, it is advantageous in use of the payment application 113 for PIN submission for the cardholder, as this PIN information is not entered in unencrypted form using the keypad of the merchant device 17.

Therefore, the provision of a technical solution, including the payment application 113, involves using PIN information entered via the computer device 12 (i.e. using the user interface 104 and the communications interface 102).

Transaction Application 113

Referring to FIG. 2, it is recognized that the transaction application 113 can include a plurality of OMRI 200 or the product code data 3 related processing functionality, a plurality of transaction processing functionality and/or client functionality configured for network 11 communication with a transaction service 20 in a client-server relationship. For example, the transaction application 113 can be configured as a thin client of the transaction service 20, such that the transaction application 113 is configured to interact with the OMRI processing system 80 (of the interface 8,15) via a series of web pages generated by the OMRI processing system 80, sent via network messages 13 and displayed on the user interface 104. Accordingly, the transaction application 113 would interact with a web browser (or other network communication program) to send and receive the messages 13 via the network 11 containing transaction 5 specific information, i.e. to display the web pages including output data 217 (further discussed below) for the transaction 5 and to coordinate the entry and network transmission of input data 215 (further discussed below) for the transaction 5.

Alternatively, the transaction application 113 can be configured as a thick client of the transaction service 20, such that the transaction application 113 is provisioned with transaction and/or OMRI or the code data 3 processing functionality similar to (or at least contains a portion of) that functionality of the transaction processing system 80 and/or the OMRI processing system 90, as further described below. It is recognized that the thick client version of the transaction application 113 could be configured to perform some of the transaction or OMRI or code data 3 processing on behalf of or otherwise in substitution of any of the processing functionality of the transaction processing system 80 and/or the OMRI processing system 90 implemented by the overall system 10 during processing of the transaction 5. It is also recognized that the thick client version of the transaction application 113 could also be configured to communicate over the network 11 via a series of web pages (or other electronic data content formats such as XML files) as generated or otherwise received by the transaction processing system 80 of the interfaces 8,15, sent via as network messages 13 between the computer device 12 and the interfaces 8,15.

Referring to FIG. 2, the environment 10 can use a transaction flow, i.e. a defined interaction (e.g. transaction workflow instructions, executed by the computer device 12 via the transaction application 113 and/or device browser, and/or by the computer 6,17 of the interface 8,15) between the interface(s) 8,15 and the transaction application 113 of the computer device 12, to provide the consumer 18 with the ability to initiate (or otherwise respond to) a variety of transaction types. These transaction types can be encoded in the symbology information 204 of the OMRI 200 or the product code data 3 (or otherwise associated with the merchant profile 117 information stored and available to the transaction service 20), and are used by the interface(s) 8,15 and the transaction application 113 to direct (via the workflow instructions appropriate to the transaction type, for example stored or otherwise accessible to the transaction interface 15 via the local storage 110) the consumer 18 to provide transaction appropriate input data 215 and to present transaction appropriate output data 217 to the consumer 18 (via operation of the user interface 104). One example of output data 217 dependent on the transaction type (e.g. a restaurant bill) would be a set of instructions displayed on the user interface 104 on how to enter a tip amount (e.g. various tip options such as % tip, $ tip, etc.) as well as instructions on how to confirm total meal cost including tip. Alternatively, the merchant transaction type settings can be housed in the storage 110 of the transaction service 20 and not contained in the OMRI 200 or the product code data 3, rather the transaction type settings can be stored as part of the merchant profile 117 (e.g. part of the stored merchant data). Therefore, the OMRI 200 or the product code data 3 would contain (or otherwise reference) a merchant profile identifier 203 that is used to access the merchants transaction type settings by the transaction service 20 associated with the merchant profile 117. It is also recognized that the identifier 203 can be a unique identifier 203 of the transaction 5 (e.g. a unique transaction number) payment request and can be associated with the confirmation messages sent to the consumer 18 and/or the merchant 16 by the transaction interface 15. In this case, the merchant data 206 would be used in the payment request to help identify the merchant 16 via the merchant profile 117.

It is recognized that the output data 217 could include definitions on data content (e.g. specific wording of instructions, advertizing content associated with instructions, etc.) and/or data format of instructions (e.g. font type, font colour, background colour, included images, etc.). It is also recognized that the output data 217 could include definitions on content and display format of consumer selections (e.g. drop down menus, data entry fields, etc.) used by the transaction application 113 to facilitate entry of the transaction appropriate input data 215 by the consumer 18.

In view of the above, it is recognized that the input data 215 and the output data 217 can take a variety of different content and form, depending upon the transaction functionality (via the workflow instructions appropriate to the transaction type) needed during interaction by the interface 8,15 with the consumer 18 once the transaction 5 is initiated. The input data 215 can include the consumer data 211 (further defined below), which can be obtained from: registration details 117 of the consumer 18 that is stored (in database 110) and available to the merchant device 17 or transaction service device 6; data that is entered or otherwise selected by the consumer 18 using the user interface 104; data that is obtained from the symbology information 204 of the OMRI 200, or any combination thereof. It is recognized that the interfaces 8,15, as well as any thick client transaction functionality configured into the transaction application 113, can have stored (in their memory 110) appropriate workflow instructions assigned or otherwise associated with each of the transaction types. It is envisioned that knowledge of the workflow instructions for a particular transaction 5 can be accessible and executable by the transaction application 113, the interface 8, the interface 15, or a combination of any of the above.

One obvious difference in workflow instructions and input data 215 requirements for transactions is for those purchases involving a tip option (e.g. sit down restaurant meal) and those that do not (e.g. retail product purchase or take-out meal purchase). Another obvious difference in workflow instructions and input data 215 requirements for transactions is for online purchases versus POS purchases, such that the latter mayor may not require consumer address information if the consumer can carry the purchased products themselves.

Payment Request Content

Referring again to FIGS. 2 and 4, the payment request of the transaction 5 can be used by the consumer 18 and the merchant 16 to define what has been purchased, when, by whom, from whom, and how much money has been spent on what. The OMRI 200 is generated to include the symbology information 204 (or the product code data 3 is generated as a reference lookup identifier to reference information) including product invoice information 201 for two or more products (for example), such that the symbology information 204 of the OMRI 200 (or reference information of the or the product code data 3—e.g. stored in lookup table or database 63) encodes information 201 of product data 206, merchant data 208, consumer data 211 and/or transaction data 210 of the transaction 5. Therefore, the OMRI 200 or the product code data 3 represents the transaction 5, using the symbology information 204 in the case of the ORMI 200 or as table reference information 61 in the table 63), defined as a commercial contract issued by the merchant 16 to the consumer 18, indicating the products, quantities, and/or agreed prices for products the merchant has (or will) provide the consumer 18 in exchange for payment (i.e. debit of consumer account and corresponding debit of merchant account) of the transaction 5. Further, the payment request indicates the consumer 18 must pay the merchant 16, according to any payment terms contained in the payment request. It is also recognized that the payment request in a rental or professional services context could also include a specific reference to the duration of the time being billed, so rather than quantity, price and cost, the invoicing amount can be based on quantity, price, cost and duration. For example, the rental/services payment request can refer to the actual time (e.g. hours, days, weeks, months, etc.) being billed.

It is recognized that from the point of view of a merchant 16, the payment request can be regarded as a sales invoice. From the point of view of the consumer 18, the payment request can be regarded as a purchase invoice. The payment request can identify both the consumer 18 and the merchant 16, but the term "payment" generally refers to the fact that money is owed or owing between the merchant 16 and consumer 18.

For example, the product data 206 (e.g. of the symbology information 204) can include for each product, information such as but not limited to: a product identifier (e.g. product number or code—such as a UPC code), a product purchase price (e.g. unit price of the product), a quantity number of the product (e.g. the number 2 in the case where two of the same product in the purchase order); and/or a description of the product. The merchant data 208 (e.g. of the symbology information 204) can include information such as but not limited to: name and contact details of the merchant; a bank account number of the merchant; a unique merchant reference ID of the merchant assigned by the transaction interface 15; location of the merchant retail location; tax or merchant registration details (e.g. tax number or business number such as a VAT (value added tax) identification number or a registration number for GST purposes in order to claim input tax credits) and/or indication of whether the purchase is an online or physical retail location purchase. The transaction data 210 (e.g. of the symbology information 204) can include information such as but not limited to: a unique invoice reference number (for use in tracking correspondence associated with the transaction 5 associated with the payment request); date of the invoice; tax payments as a percentage of the purchase price of the each of the products (e.g. GST or VAT); date (e.g. approximate) that the products were (or are to be) sent or delivered; purchase order number (or similar tracking numbers requested by the consumer 18 to be mentioned on the payment request); total amount charged (optionally with breakdown of taxes) for the product(s); payment terms (including method of payment, date of payment, and/or details about charges for late payment); international customs information; shipping destination; and/or shipping origination location. It is recognized that the data 206,208,210,211 (e.g. of the symbology information 204) is also represented in at least whole or in part in the textual request information 201. In this manner, what symbology information 204 in the ORMI 200 can be decoded (by the computer device 12 and/or the transaction interface 15) into the payment information 201, and the payment information 201 can be encoded (e.g. by the transaction interface 15, merchant interface 8, and/or the payment application 113) into the symbology information 204.

In terms of consumer data 211, this data (e.g. of the symbology information 204) can include information such as but not limited to: a reference code to be passed along the transaction identifying the payer (e.g. consumer 18); name and contact details (e.g. address) of the consumer 18; and/or an account number (e.g. a bank account number, a credit card number, a debit card number of the consumer 18) identifying the source of funds to be used to pay for the products. It is recognized that the account number identifying the consumer 18 source of funds to be used to pay for the products, instead of being encoded in the symbology 204, can be supplied by the consumer 18 using the user interface 104 of the consumer computer device, as further described below.

As discussed above, it is recognized that the customized coding scheme 209 contains codewords and rules for use in translating (i.e. encoding, decoding) between the symbology information 204 of the OMRI 200 and the payment information 201 of the payment request associated with the financial transaction 5 (i.e. transfer of funds between accounts 70,72 as performed by the payment processing system 14). It is also recognized that the product code data 3 can be used as a lookup identifier to obtain (e.g. the product code data 3 is cross referenced to transaction/product/consumer/merchant information 61 in the lookup table 63) the data 206,208,210,211 included in the information 61.

Exemplary Transaction Service 20 Embodiment:

As illustrated in FIG. 1, the transaction service 20 may consist of: a Mobile Payment Transaction Interface 15 that resides on a Transaction Server 6, which can be configured to enable the transaction interface 15 to communicate with the Mobile Payment Client application 113 and the Payment Platform (e.g. transaction processing system 14). The Transaction Server 6 can also house the merchant profile information; the consumer profile information (e.g., name, address, phone number, e-mail address, Payment Account Information, etc.); allow the consumer to access his/her account via the web; allow the Payment Platform (e.g. transaction processing system 14) to communicate with the mobile application 113 and the transaction interface 15.

A mobile application 113, which resides on the consumer's mobile device 520 can be used to: capture/scan the OMRI 200 or product code data 3 information; create a Transaction on the Payment Platform; communicate with the Payment Platform; communicate with the Merchant Transaction Server; provide Consumers with transaction options (e.g., buy, decline transaction, send personal information, go to merchant website, more info, etc.); provide customized process flows based on the merchant type (e.g., prompt for a tip if the merchant is identified as a restaurant, bypass user confirmation of a transaction for transactions under a certain price, prompt the user to send personal information to the merchant in order to auto-populate any forms that the merchant may need filled out, etc.); allow the Consumer to select his/her desired Payment Account (e.g., credit, debit, chequing, E-wallet, coupon, gift card, etc.); and allow the Consumer to log in to his/her account for account maintenance purposes.

A Mobile Payment Application merchant interface 8 can reside on a merchant mobile device 17 and can be used to: receive payment confirmations/declines from the transaction interface 15; generate a OMRI 200 or the product code data 3 "on the fly" that includes or is referenced to the transaction ID, merchant ID (merchant's name and merchant's URL can also be provided), items) purchased, and price.

In another embodiment, the product code data 3 can be implemented as a short code service (i.e. unencoded textual information as compared to coded textual information in the form of a barcode 200). The way this works is that instead of scanning or otherwise supply the barcode 200, the consumer 18 provides a short code as the product code data 3 (e.g. a sequence of characters including numeric characters and/or alpha characters) that is also known to the transaction Service 20 as the product code data 3 used in identifying the actual information 201 stored as information 61 cross-referenced or otherwise indexed to the product code data 3 in the lookup table 63, which can be stored and accessible by the transaction interface 15. Therefore, after providing the product code data 3 as a series of numeric characters and/or alpha characters to the merchant application 8, the rest of the split purchase transaction 5 process is exactly the same. One advantage in using the short code is that it works in situations where generating or otherwise scanning/processing the barcode 200 is not feasible by the merchant application 8 and/or the payment application 113.

In another embodiment, the communication means for identifying the information 201 used in processing the transaction 5 to the transaction Service 20 via the merchant terminal 17 (i.e. via the merchant application 8) can involve the transmission of the product code data 3 from the Mobile Device 12 (i.e. via the payment application 113) to the merchant terminal 17 (i.e. via the merchant application 8) using NFC, Bluetooth, Infrared or other similar short-range, communication technology. In the case of a short code being used as the product code data 3, the transmission of this product code data 3 information to the merchant 16 may be something as simple as verbal transmission between the merchant 16 and consumer 18 and/or by simply reading of the product code data 3 off of the screen of the device 12 by the merchant 16—in the case where the product code data 3 is displayed on the screen of the device 12 (e.g. via interaction with the payment application 113 by the consumer 18). Another embodiment is where a speaker of the device 12 is used by the payment application 113 to audibly communicate the product code data 3 to the merchant 16. In another embodiment, the product code data 3 is communicated to the merchant terminal 17 via a network 11 communication message as can be the case for transmission of the ORMI 200.

Transaction Service 20 Applications in Print Media and Electronic Media Commerce Amongst its many other benefits, the transaction service 20 can marry mobile commerce with Electronic Media, and Print Media commerce in ways never thought possible before. Electronic media includes, but is not limited to, television, electronic billboards, and video display terminals. Print Media includes, but is not limited to, magazines, newspapers, catalogues, telephone directories, parking ticket and utility bills. The transaction service 20 can provide a marked improvement over the current Electronic and Print Media sales and advertising model. Currently, in order to make a purchase of goods and/or services, or to register for a service advertised via Electronic or Print Media, a consumer is required to: place a phone call to the merchant or a call center and provide the consumer service representative with his/her personal information and Payment Account Information. Optionally, the Consumer has to browse to a website and provide his/her personal information and Payment Account Information online. In either scenario the Consumer is obliged to go through a time consuming process that requires him/her to provide his/her personal information and expose his/her Payment Account Information to the merchant.

The transaction service 20 addresses these problems by allowing a Consumer to initiate a purchase transaction by scanning the OMRI 200 (or otherwise recognizing/noting the product code data 3) displayed by the particular Electronic or Print Media. The rest of the transaction is completed on the Consumer's mobile device 12, without requiring the Consumer 18 to place a phone call or fill out personal information and/or Payment Account Information on the merchant's site.

The transaction service 20 benefits the merchant 16, in that it allows the merchant to save money by not requiring the merchant to have a call center to process orders. It also benefits the merchant by providing Consumers with a simplified transaction process, which in turn can reduce abandoned registrations and purchases. The transaction service 20 benefits the Consumer by safeguarding the Consumer's Payment Account Information and by providing the Consumer with a significantly more simplified payment/registration process.

Transaction Service 20 Applications for Point of Sale Transactions

A Point of Sale Transaction may be a retail POS terminal, ATM machine or similar device. The transaction service 20 can provide Consumers with a consistent transaction 5 process regardless of the transaction type (i.e. POS, Print Media, Electronic Media or e-commerce).

Within the context of retail POS Terminals, the transaction service 20 can provide Consumers 18 the comfort of not having to expose Payment Account Information to a cashier at checkout. It can also provide the merchant 16 with the benefit of not having to handle cash, thereby reducing the risk of employee theft. Under the transaction service 20, it is the Consumer 18 that carries out the image scanning using his/her mobile device 12. This can save the merchant 16 money by not requiring it to purchase/install any image scanning devices (or at least a reduced number of such merchant scanning devices). Furthermore, the transaction service 20 may benefit the merchant 16 by expediting the payment and consumer information gathering processes at checkout.

Within the context of ATM machines, the transaction service 20 can provide security in not requiring a Consumer 18 to enter his/her PIN at an ATM terminal associated with the merchant device 17. In an increasingly health conscious world, it can provide an additional hygiene benefit of not requiring a Consumer 18 to touch a key pad at a public ATM machine. The transaction service 20 technology can also provide the ATM operator with a cheaper mobile payment processing service, in that it does not require the ATM machine to be outfitted with an image scanning device.

The transaction service 20 disclosed herein facilitates mobile commerce by providing a mobile device 12 to be used to process transactions 5 originating either online, via Electronic Media or Print Media and from POS Terminals 17. Thus, Consumers 18 can be provided with a consistent transaction 5 process regardless of where the transaction 5 originates. When the transaction service 20 is used in operation, the Consumer 18 may use his/her mobile device 12 to scan the OMRI 200 or otherwise note the product code data 3, displayed and made available by the merchant 16, to initiate the transaction 5 process. The OMRI 200 may be in the form of a graphical image, such as a 2-D barcode or hologram, which encodes information relating to a particular transaction 5 and/or a particular merchant 16 (e.g. through the merchant identifier 203 associated with the OMRI 200.

The transaction interface 15 of the transaction service 20 may generally comprise certain computer software applications each of which run on certain physical components of the transaction network, and which are configured to be able to communicate, and to share information, with each other, where appropriate, as further described herein. More specifically, the transaction interface 15 may interact over the network 11 with software applications including the mobile application 113 running on the Consumer's mobile device 12 and the merchant interface 8 running on the merchant Transaction device(s) 17. In the scenario where the transaction service 20 is utilized to enable the Consumer 18 to effect a Print Media or Electronic Media commerce transaction 5 using his/her mobile device 12, a suitable pre-encoded OMRI 200 or the product code data 3 can be simply presented on said media (there is no need to have a software application to generate a Transaction-specific OMRI 200 or the product code data 3 "on the fly"). In the scenario where the transaction service 20 is utilized to enable the Consumer 18 to effect the e-commerce transaction 5 (e.g., an online purchase) using his/her mobile device 12, a software application (e.g. systems 90) for generating a suitable OMRI 200 or the product code data 3 may reside either on the consumer's computer 12 or the merchant's e-commerce server 17, and the generated OMRI 200 or the product code data 3 can be displayed on the Consumer's computer screen for scanning. In the scenario where the transaction service 20 is utilized to provide for the Consumer 18 to make a purchase using his/her mobile device 12 at a POS Terminal 17, the system 10 can additionally comprise the Mobile Payment interface 8 running on the merchant POS Terminal 17.

Figure 5:
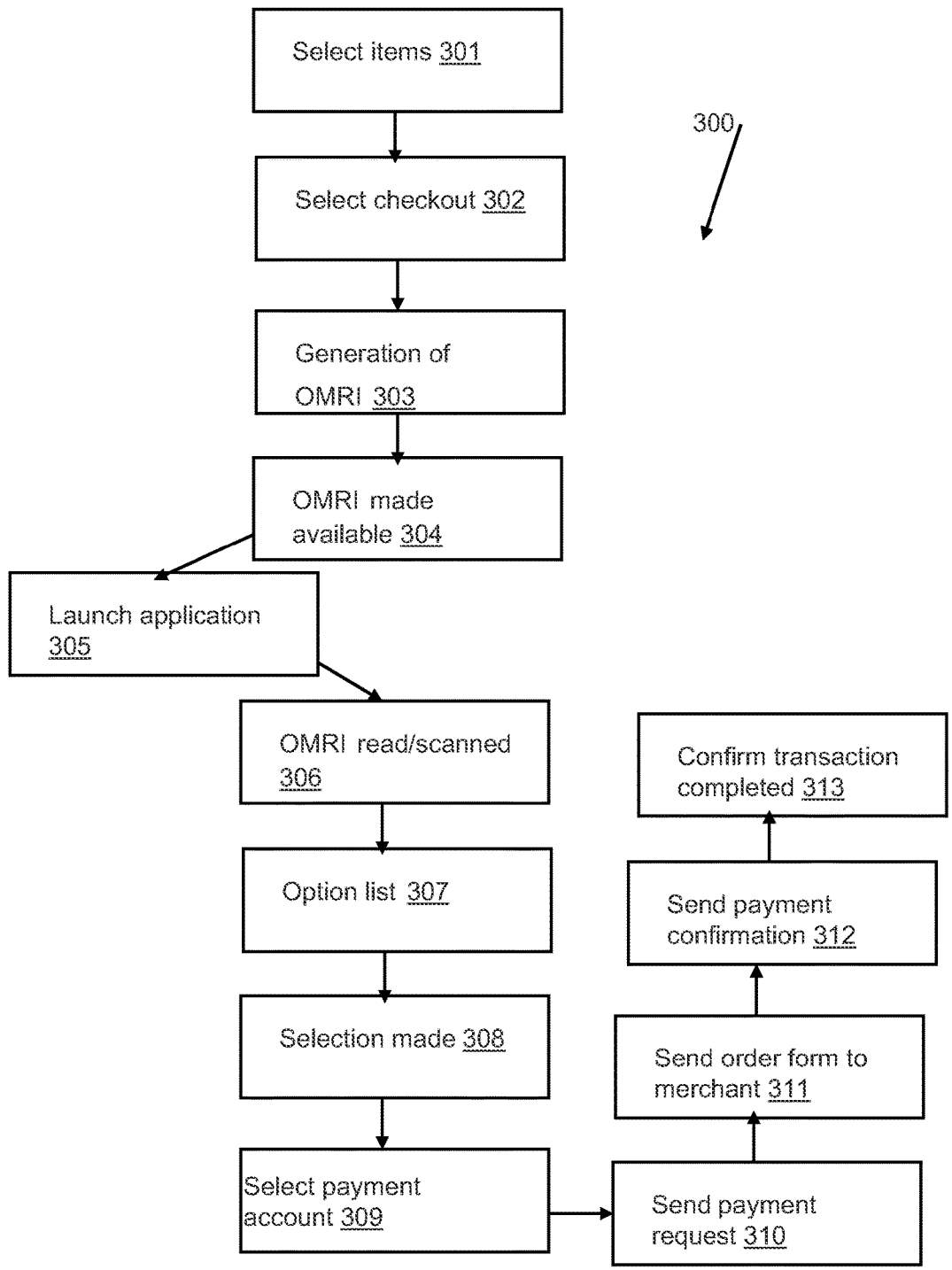
FIG. 5 is an example operation of the system of FIG. 2.

The following describes the steps involved in a simple online or POS transaction 5 utilizing the transaction service 20, according to an embodiment 300, referring to FIG. 5.

Step 301. The Consumer 18 may select item(s) to be purchased on a merchant website or in a store (e.g. selected by the consumer 18 from the environment 4 or provided by the merchant device 17 in person or in a network 11 communications message).

Step 302. The Consumer 18 can select "checkout" (or the equivalent thereof) or go to the cashier.

Step 303. The merchant interface 8 on the merchant device 17 may be sent the "shopping cart" information (or in the case of a POS transaction, the cash register information) and generate an OMRI 200 containing all the particulars of the purchase (of the transaction 5).

Step 304. The OMRI 200 or the product code data 3 may be displayed either on a computer screen or, in the case of a POS transaction, merchant display terminal 17.

Step 305. The Consumer 18 can launch the Mobile Payment Client or mobile application 113 on his/her mobile device 12 and scan the OMRI 200 or otherwise note the product code data 3.

Step 306. The mobile application 113 can read the OMRI 200 or the product code data 3 (e.g. the product code data 3 can be entered manually by the consumer 18 via the user interface) and communicate with the merchant interface 8 or transaction interface 15 to identify the merchant 16.

Step 307. The Consumer 18 can be presented a list of options including "BUY NOW".

Step 308. The Consumer 18 can select "BUY NOW".

Step 309. The mobile application 113 can then prompt the Consumer 18 to select the payment account 70,72 type and provide login information such as a PIN number (which can be supplied using the consumer code data 3).

Step 310. The mobile application 113 may communicate with the Payment Platform (e.g. transaction processing system 14) via the transaction interface 15 to authenticate the Consumer 18 and to process the payment request associated with the transaction 5. This can also be done via the transaction interface 15 rather than directly with the payment platform 14.

Step 311. In the event that there are sufficient funds/credit in the Consumer's account 70,72, the mobile application 113 can prompt the user 18 to send the Order Form Data to the merchant 16.

Step 312. The Consumer 18 can select "YES" and the mobile application 113 sends the Order Form Data and the payment confirmation to the merchant interface 8 running on the merchant device 17.

Step 313. By communicating with the mobile application 113, the transaction interface 15 can notify the Consumer of a successful Transaction 5 and e-mail a receipt to the Consumer's 18 registered e-mail address. In the case of a POS transaction, a paper receipt can be given to the Consumer 18. The Transaction 5 is now complete.

In the case of Electronic Media, Print Media and other "static" applications, a pre-encoded OMRI 200 or the product code data 3 that contains or is otherwise referenced to information 201 that is specific to the transaction (e.g., merchant ID, merchant name, product(s) name, product(s) price, total, merchant URL, etc.) can be presented on the Electronic Media or Print media, without requiring a transaction-specific OMRI 200 or the product code data 3 to be generated "on the fly."

The steps involved in another exemplary payment transaction utilizing the transaction service 20, according to an embodiment, are described below, with reference to FIG. 1.

Step 1. The Consumer 18 can select item(s) to be purchased on a merchant website or in a store.

Step 2. The Consumer 18 can select "checkout" (or the equivalent there of) or go to the cashier.

Step 3. The merchant interface 8 on the merchant device 17 can be sent the "shopping cart" information (or in the case of a POS transaction, the cash register information) and generate an OMRI 200 or the product code data 3 containing or otherwise referenced (e.g. indexed to) the particulars of the purchase (e.g., transaction amount, taxes, etc.) and information about the merchant 16 (e.g., merchant identifier(s), merchant authentication credentials, etc.).

Step 4. The OMRI 200 or the product code data 3 can be displayed either on a computer screen (not specifically shown in FIG. 1) or, in the case of a POS transaction, the display of the merchant POS Terminal or merchant device 17.

Step 5. The Consumer 18 can launch the mobile application 113 on his/her mobile device 520 and scan the OMRI 200 or otherwise take note or enter the product code data 3.

Step 6. The mobile application 113 can read the OMRI 200 and decode the data encoded in the OMRI 200 in order to extract the merchant data 208 (such as merchant ID, transaction ID, amount of purchase and any other pertinent information, etc.). In the case of the product code data 3, this can he interpreted using a lookup table 63 available to the application 113 or can be sent to the transaction service 20 (e.g. via the merchant interface 8) for interpretation by the transaction service 20 using the lookup table 63 available to the transaction service 20.

Step 7. The mobile application 113 can open a secure encrypted communications channel with the transaction interface 15 (the transaction interface 15 running on transaction server 6) via the Internet 11 or other intermediary communications network. All further communication with the transaction interface 15 can be via this secure channel.

Step 8. The mobile application 113 can authenticate itself with the transaction interface 15 using previously agreed upon and configured credentials that tie the mobile device 12 to an individual consumer 18, for example where the device data of the consumer data 211 is matched to device data stored in the consumer profile 117 stored in the storage 110 of the transaction interface 15.

Step 9. The transaction interface 15 may validate the authentication credentials of the mobile application 113 against a database 117 of known (registered) mobile devices 12 and consumers 18.

Step 10. Upon successful authentication, the mobile application 113 can pass the scanned OMRI 200 data (for example containing at least a portion of the original symbology information 204—encoded information of the scanned ORMI 200) or the product code data 3 to the transaction interface 15 to initiate the purchasing process.

Step 11. The transaction interface 15 can validate the OMRI 200 data or the product code data 3 for correctness (e.g., merchant information, transaction amounts, etc.), retrieve the merchant information (e.g. via decoding for the ORMI 200, using the product code data 3 to lookup the information 61 resident in the table 63, etc.) and begin a new purchase transaction 5. The OMRI 200 may be encoded with unique information that is only relevant to the transaction interface 15, such as for example, a unique merchant ID identifying the merchant 16 and said merchant's profile 117 on the transaction server 6. The merchant profile 117 may contain all relevant information pertaining to the merchant 16 including but not limited to: secure connection instructions, merchant inventory list, address, contact information, merchant account information, passwords, access instructions, merchant implementation specifics, policies and procedures pertaining to the merchant 16. In terms of the product code data 3, the product code data 3 may be referenced to unique information in the table 63 that is only relevant to the transaction interface 15, such as for example, a unique merchant ID identifying the merchant 16 and said merchant's profile 117 on the transaction server 6. The merchant profile 117 (as referenced via the table 63) may contain all relevant information pertaining to the merchant 16 including but not limited to: secure connection instructions, merchant inventory list, address, contact information, merchant account information, passwords, access instructions, merchant implementation specifics, policies and procedures pertaining to the merchant 16.

Step 12. The transaction interface 15 can look up the available payment methods for the Consumer 18 and return this along with the transaction 5 details to the mobile application 113. The available methods will depend on options available to the particular Consumer 18. Typical payment methods include but are not limited to: E-wallet, coupon, gift-card, debit and credit card. Additional limitations on the options will be imposed based on funds available for each of the configured methods, currency, transaction amount or other parameters. In the case of gift-cards or coupons, the funds available to the Consumer 18 can be altered based on pre-defined properties of the coupon or gift-card. For example, a gift-card for Merchant X entered in the Consumer's account 72 on the Payment Platform 14 could only increase the funds available to the Consumer 18 when a purchase is being made at Merchant X.

Step 13. The mobile application 113 displays (e.g. output data 217) a summary of the transaction 5 to be completed (e.g., amounts, quantities, merchant identity, etc.) on the Consumer's mobile device 12.

Step 14. In an embodiment, additional input fields may be presented to the Consumer 18 by the mobile application 113. For example, in the case of a restaurant or taxi purchase there will typically be the desire to allow the Consumer 18 to add an additional "tip" to the total transaction 5 amount (e.g. as input data 215).

Step 15. The mobile application 113 can display the payment methods available to the Consumer 18 along with the transaction 5 details from step 13 and, if applicable, step 14.

Step 16. The Consumer 18 can select his/her preferred payment method and provide any additional payment authentication data, such as a PIN or password.

Step 17. The mobile application 113 may communicate with the Payment Platform (e.g. transaction processing system 14) via the transaction interface 15 to authenticate the Consumer 18 and to process the payment.

Step 18. Upon successful authentication of the PIN, the Payment Platform (e.g. transaction processing system 14) can then perform the requested financial transactions 5 to charge the amount of the transaction to the Consumer's Payment Account 72 and credit that amount to the merchant's account 70.

Step 19. Upon successful completion of the transaction, the mobile application 113 may prompt the Consumer 18 to send Order Form Data to the merchant 16 in situations where it may be required (e.g., to provide a shipping address for hard goods).

Step 20. The Consumer can select "YES" and the mobile application 113 instructs the transaction interface 15 to send the Order Form Data to a Mobile Payment Application interface 8 running on the Merchant Transaction Server 17.

Step 21. The transaction interface 15 can notify the merchant interface 8 on the merchant POS Terminal 17 of Transaction 5 completion by transmitting the Transaction information in a confirmation message, including but not limited to the following:

Date and time;
merchant name;
Transaction ID;
Transaction amount;
Transaction status (approved/declined); and
Any other identifying information required by the merchant and governing POS standards.

While the Transaction 5 information is described herein as being transmitted to the merchant interface 8 on the merchant POS Terminal 17, it should be appreciated that this may also be transmitted indirectly to the merchant interface 8 on the merchant POS Terminal 17, i.e., the Transaction 5 information may be transmitted to the Merchant Transaction Server 17, to be passed on to the merchant interface 8 and thereby to the POS terminal adjacent to the consumer 18.

Step 22. The transaction interface 15 may also notify the mobile application 113 with the same or similar transaction 5 information as was transmitted to the merchant 16 (step 21).

Step 23. The transaction interface 15 may notify the Consumer 18 of Transaction 5 completion and e-mail a receipt to the Consumer's registered e-mail address. In the case of a POS transaction 5, a paper receipt can be given to the Consumer 18. The Transaction 5 is now complete.

In an alternative embodiment, the transaction service 20 can also be similarly utilized to facilitate purchases of items from Electronic Media, Print Media and other "static" applications. In these cases, a pre-encoded OMRI 200 that contains information that is specific to the transaction (e.g., merchant ID, merchant name, product(s) name, product(s) price, total, merchant URL, etc.) can be presented on such Electronic Media or Print Media for scanning by the Consumer's mobile device. The steps for this alternative embodiment would be largely identical to those described in the exemplary method above, except that steps 1-4 above would be substituted by:

Step 1. A pre-encoded OMRI 200 or the product code data 3 containing or otherwise referenced to information specific to a Transaction (e.g., merchant ID, merchant name, product(s) name, product(s) price, total, merchant URL, etc.) can be presented on Electronic Media or Print Media for scanning by the Consumer's mobile device 12 or otherwise for data entry via the user interface of the device 12 (e.g. text entry).

It should be appreciated that in the case of an embodiment such as one involving Print Media, where there is no MPA running on a merchant POS Terminal, step 21 would be modified as follows:

Step 21. The transaction interface 15 may notify the merchant interface 8 on the Merchant Transaction Server 17 of Transaction 5 completion by transmitting the Transaction 5 information, including the following:

Date and time;
merchant name;
Transaction ID;
Transaction amount;
Transaction status (approved/declined); and
Any other identifying information required by the merchant.

Example Processing Systems 80, 90 Configuration

Referring to FIGS. 2 and 3, the transaction service 20, for example, has the transaction interface 15 including the transaction processing system 80 and the OMRI or the product code data 3 processing system 90, such that the processing system 90 generates the OMRI 200 or the product code data 3 for the merchant 16 (or directly for the consumer 18) and the transaction processing system 80 interacts with the merchant 16 and the consumer 18 to process the transaction 5 there-between upon receipt of the OMRI 200 or the product code data 3 (and/or information obtained from the OMRI 200 or the product code data 3 from the transaction application 113 provisioned on the computer device 12) from the consumer 18. It is also recognized (as shown in FIG. 2) that the merchant interface 8 can also have a transaction processing system 80 and a processing system 90 with similar or differing (e.g. complimentary) functionality to that of the systems 80,90 of the transaction interface 15.

In any event, the following is an illustrative descriptive example of the basic functionality of the processing system 80 and the system 90 for implementation by the merchant interface 8, the transaction interface 15, or a combination thereof. Subsequent sections provide more specific implementation examples of various components of the processing system 80 and the system 90 (e.g. network modules 40,50, OMRI or the product code data 3 generation modules 32, 62, decoder modules 66 (including transaction modules 34), registration modules 60, presentment modules 33, and transaction generation module 30). It is recognized that any functionality related to OMRI or the product code data 3 generation can be implemented by the processing system 80 and any transaction processing related functionality can be implemented by the system 90, interchangeably as desired. It is also recognized that the systems 80,90 communicate with one another, as needed.

Referring to FIG. 3, the processing system 80 has a registration module 60 for via registration messages 82 (via network 11 with the devices 12,17) with the consumer 18 and the merchant 16: registering merchants 16 for interaction with the transaction service 20 and creates a merchant profile (e.g. merchant registration details 117 that can include stored merchant data 208); registering consumers 18 for interaction with the transaction service 20 and creates a consumer profile (e.g. consumer registration details 117 that can include stored consumer data 211). Also included is a network communication module 40,50 for communicating network messages 13 (and other specific network messages as provided below) between the computer device 12 and the interfaces 8,15 and between the interfaces 8,15, for example. The network messages 13, in general, provide for communication of unencoded merchant, consumer, and product information 201, symbology information 204 in the form of the generated OMRI 200, the table 63 containing information 61 that is indexed or otherwise cross-referenced to the product code data 3, confirmation information denoting whether the transaction 5 has been successfully processed by the interfaces 8,15 and/or the transaction processing system 14, transaction request messages from the computer device 12 requesting processing of the transaction 5 (including information 201 decoded from the OMRI 200 or otherwise obtained from the product code data 3 and/or symbology information 204 in or otherwise from the OMRI 200 in unencoded form), and any other network message described herein related to request and response messages for transaction 5 processing. Also included is a transaction generation module 30 configured to collect the various information 201 (e.g. product data 206, merchant data 208, transfer or transaction data 210, consumer data 211, and/or transaction or merchant identifier data 203) for conversion into the symbology information 204 by the system 90 or otherwise insertion into the table 63 as information 61 that is then indexed or otherwise cross-referenced to the product code data 3. Also included can be a presentment module 33 for configuring the generated OMRI 200 or the product code data 3 for display on a display and/or for printing on a physical medium (or audibly presenting the product code data 3).

Also included can be a transaction processing module 65 for coordinating funds transfer instructions between financial accounts 70,72 settled by the transaction processing system 14, using network messages 54,56. Also included can be a transaction request module 34, which can be configured to generate a transaction 5 request to the transaction service 20 including decoded information of the OMRI 200 or the product code data 3 where appropriate.

Referring to FIG. 2, the system 90 has a generation module 32,62 that uses an encoder 120 to encode the obtained unencoded merchant and product information 201, optionally the identifier data 203, as well as any other of the product data 206, merchant data 208, transaction data 210, consumer data 211, into the symbology information 204 for inclusion in the generated OMRI 200, for subsequent delivery to the consumer environment 4 (e.g. via the merchant 16) and/or directly to the consumer 18. Alternatively, the generation module 32,62 can insert into the table 63 the information 61 that is then indexed or otherwise cross-referenced to the product code data 3 (e.g. merchant and product information 201, optionally the identifier data 203, as well as any other of the product data 206, merchant data 208, transaction data 210, consumer data 211 to be inserted into the table 63 as the information 61 mapped to the product code data 3). Also included is a transaction module 34 and/or decoder module 66 that uses a decoder 119 to decode the obtained symbology information 204 from the received OMRI 200 into merchant and product information 201, optionally the identifier data 203, as well as any other of the product data 206, merchant data 208, transaction data 210, consumer data 211. Alternatively, the transaction module 34 and/or decoder module 66 can use the product code data 3 to access the lookup table 63 and obtain the information 61 that is mapped to the product code data 3 in the table.

Also included is a transaction type module 68 that is configured to select the appropriate workflow instructions 218, input data 215 and output data 217 required by the transaction 5 associated with the identifier 203 obtained from the OMRI symbology information 204 or the product code data 3. Based on the appropriate workflow instructions 218, input data 215 and output data 217 associated with the transaction 5, the transaction type module 68 provides the content (or processes the expected content) of the network messages 13 in interaction between the computer devices 6,12,17.

Computer Device 12

Figure 6:
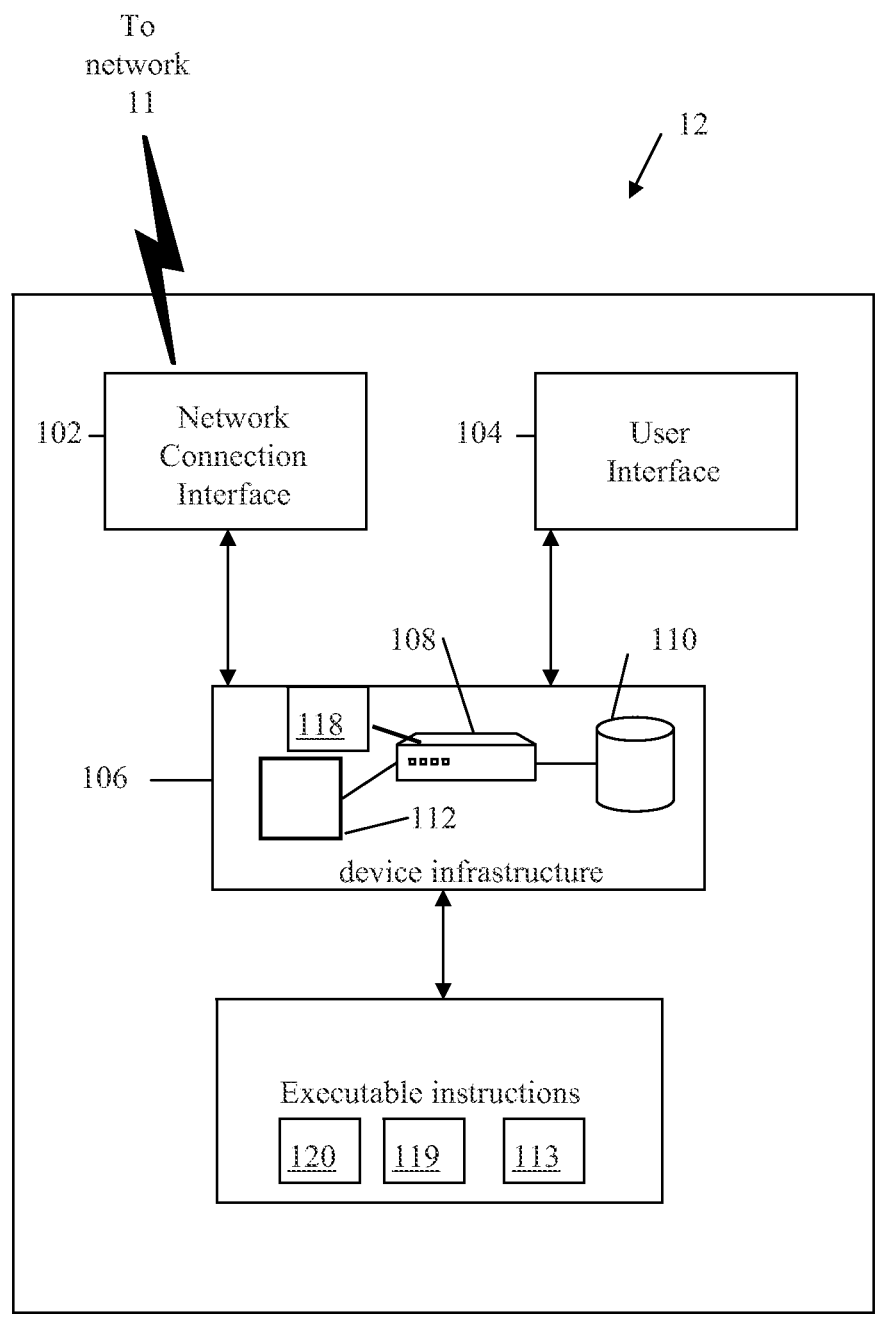
FIG. 6 is a block diagram of a computer device implementing the transaction application of FIG. 2.

Referring to FIG. 6, each computer device 12 can be a wireless-enabled (e.g. WiFi, WAN, etc.) personal data assistant, or email-enabled wireless telephone, or a desktop computer terminal. In addition, the wireless communications are not limited to only facilitating transmission of text data (e.g. encrypted) and can therefore be used to transmit image data, audio data or multimedia data, for example, as desired.

As shown in FIG. 6, the computer device 12 comprises a communication network interface 102, a user interface 104, and a data processing system 106 in communication with the network interface 102 and the user interface 104. The network interface 102 can include one or more antennas for wireless communication over the communications network 11. Preferably, the user interface 104 comprises a data entry device (such as keyboard, microphone or writing tablet), and a display device (such as an LCD display). The display screen of the user interface 104 can be used to visually present a graphical user interface (GUI) of the transaction application 113 to the user, including results of the OMRI 200 image capture process and processing. The display screen can employ a touch screen display, in which case the user can manipulate (i.e. enter and/or modify/delete) transaction 5 information (e.g. product data 206, merchant data 208, consumer data 211 and/or transaction data 210) obtained as textual information 201 from the decoded OMRI 200 or the product code data 3 and/or as supplemental information (e.g. merchant data 208, consumer data 211) added to the textual information 201 in order to generate the transaction request 64 Network message 13).

The data processing system 106 includes a central processing unit (CPU) 108, otherwise referred to as a computer processor, and a non-volatile memory storage device (e.g. DISC) 110 (such as a magnetic disc memory or electronic memory) and a read/write memory (RAM) 112 both in communication with the CPU 108. The memory 110 includes data which, when loaded into the RAM, comprise processor instructions for the CPU 108 which define memory objects for allowing the computer device 12 to communicate with one another and the transaction service 20 (for accessing the transaction interface 15) and the merchant interface 8 (e.g. one or more processing servers) over the communications network 11. The processor instructions for the CPU 108 will be discussed in greater detail below.

The CPU 108 is configured for execution of the transaction application 113 (including for example some or all of the system 80,90 functionality) for facilitating communication between the computer device 17 and the computer device 6 of the transaction service 20. For example, it is recognized that the transaction application 113 is used to coordinate, as implemented by the CPU 108, the generation, receipt, and processing of the OMRI 200 and the transaction 5 messages 13. For example, the transaction application 113 can operate the imager 118 and the encoder/decoder 119, 120.

The CPU 108 facilitates performance of the computer device 12 configured for the intended task (e.g. of the respective module(s) of the transaction application 113) through operation of the network interface 102, the user interface 104 and other application programs/hardware (e.g. web browser made available to the transaction application 113) of the computer device 12 by executing task related instructions. These task related instructions can be provided by an operating system, and/or software applications located in memory, and/or by operability that is configured into the electronic/digital circuitry of the processor(s) 108 designed to perform the specific task(s), including operation of the modules associated with the functionality of the systems 80,90. Further, it is recognized that the device infrastructure 106 can include a computer readable storage medium 110 coupled to the processor 108 for providing instructions to the processor 108 and/or to load/update the instructions. The computer readable medium 110 can include hardware and/or software such as, by way of example only, memory cards such as flash memory or other solid-state memory.

Further, it is recognized that the computer device 12 can include the executable applications comprising code or machine readable instructions for implementing predetermined functions/operations including those of an operating system, the imager 118, the decoder 119, the encoder 120 and the transaction application 113, and the browser, for example. The processor 108 as used herein is a configured device and/or set of machine-readable instructions for performing operations as described by example above, including those operations as performed by any or all of the imager 118, the decoder 119, the encoder 120 and the transaction application 113. As used herein, the processor 108 may comprise any one or combination of, hardware, firmware, and/or software. The processor 108 acts upon information by manipulating, analyzing, modifying, converting or transmitting information for use by an executable procedure or an information device, and/or by routing the information with respect to an output device. The processor 108 may use or comprise the capabilities of a controller or microprocessor, for example.

The data processing system 106 includes the imager 118 (e.g. a camera including an image sensor—e.g. CCD or CMOS sensor) suitable for capturing images of the OMRI 200 or the product code data 3 displayed or otherwise presented by the merchant 16 within range of the imager 118 or the consumer 18. The transaction application 113 is configured to control the operation of the imager 118 to capture the image of the OMRI 200, as well as to operate the decoder 119 to provide for decoding at least a portion of the symbology information 204 into textual information 201, if so configured, for subsequent use in generating the transaction/payment request message 13 directed to the transaction service 20. The storage 110 can also contain the customized coding interpretation scheme 209 for use in decoding/encoding the OMRI 200.

Further, it is recognized that the device 12 can include executable applications comprising code or machine readable instructions for implementing predetermined functions/operations including those of an operating system and the modules associated with any of the functionality of the systems 80,90 for example.

Transaction Service Device 6

Figure 7:
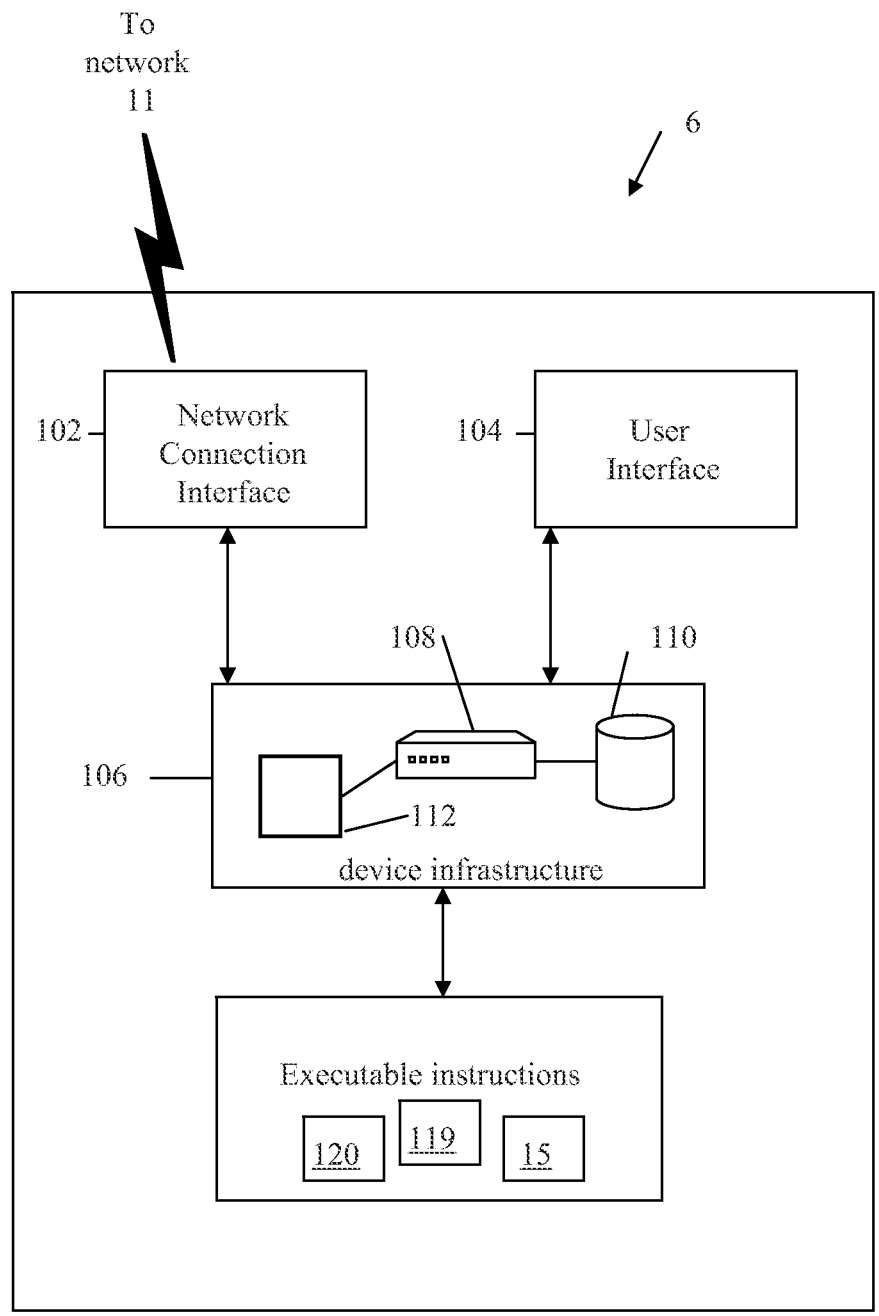
FIG. 7 is a block diagram of a computer device implementing the transaction service of FIG. 2.

Referring to FIG. 7, the device 6 can be a wireless-enabled (e.g. WiFi, WAN, etc.) personal data assistant, or email-enabled wireless telephone, for example a tablet. In addition, the wireless communications are not limited to only facilitating transmission of text data (e.g. encrypted) and can therefore be used to transmit image data, audio data or multimedia data, for example, as desired. Preferably, the device 6 is a network server, for example.

As shown in FIG. 7, the device 6 can comprise a communication network interface 102, a user interface 104, and a data processing system 106 in communication with the network interface 102 and the user interface 104. The network interface 102 can include one or more antennas for wireless communication over the communications network 11. The user interface 104 can comprise a data entry device (such as keyboard, microphone or writing tablet), and a display device (such as an LCD display).

The data processing system 106 includes a central processing unit (CPU) 108, otherwise referred to as a computer processor, and a non-volatile or volatile memory storage device (e.g. DISC) 110 (such as a magnetic disc memory or electronic memory) and a read/write memory (RAM) 112 both in communication with the CPU 108. The memory 110 includes data which, when loaded into the RAM, comprise processor instructions for the CPU 108 which define memory objects for allowing the device 6 to communicate with the computer devices 17,12 and the transaction processing system 14 (e.g. one or more processing servers) over the communications network 11. The instructions can be used to provide or otherwise host the transaction interface 15 as a website running on the computer device 6 and accessed via the network 11.

The CPU 108 is configured for execution of the transaction interface 15 for facilitating communication with the transaction processing system 14 and the computer devices 17,12. For example, it is recognized that the transaction interface 15 is used to coordinate, as implemented by the CPU 108, the generation, receipt, and processing of the textual information 201 and the symbology information 204 of the OMRI 200 and use of the product code data 3 to access the lookup table 63, as well as coordinating the settlement of funds transfer of the transaction 5, if any, between the specified accounts 70,72.

The CPU 108 facilitates performance of the device 6 configured for the intended task (e.g. of the respective module(s) of the transaction interface 15) through operation of the network interface 102, the user interface 104 and other application programs/hardware (e.g. web service made available through the transaction interface 15) of the device 6 by executing task related instructions. These task related instructions can be provided by an operating system, and/or software applications located in memory, and/or by operability that is configured into the electronic/digital circuitry of the processor(s) 108 designed to perform the specific task(s). Further, it is recognized that the device infrastructure 106 can include the computer readable storage medium 110 coupled to the processor 108 for providing instructions to the processor 108 and/or to load/update the instructions. The computer readable medium 110 can include hardware and/or software such as, by way of example only, memory cards such as flash memory or other solid-state memory. The storage 110 can also contain the customized coding interpretation scheme 209 for use in encoding and/or decoding the OMRI 200, as well as interpretation of the product code data 3 via the lookup table 63.

Further, it is recognized that the device 6 can include the executable applications comprising code or machine readable instructions for implementing predetermined functions/operations including those of an operating system and the modules associated with any of the functionality of the systems 80,90 for example. The processor 108 as used herein is a configured device and/or set of machine-readable instructions for performing operations as described by example above, including those operations as performed by any or all of the modules associated with any of the functionality of the systems 80,90. As used herein, the processor 108 may comprise any one or combination of, hardware, firmware, and/or software. The processor 108 acts upon information by manipulating, analyzing, modifying, converting or transmitting information for use by an executable procedure or an information device in relation to transaction 5 processing, and/or by routing the information with respect to an output device. The processor 108 may use or comprise the capabilities of a controller or microprocessor, for example.

Merchant Device 17

Figure 8:
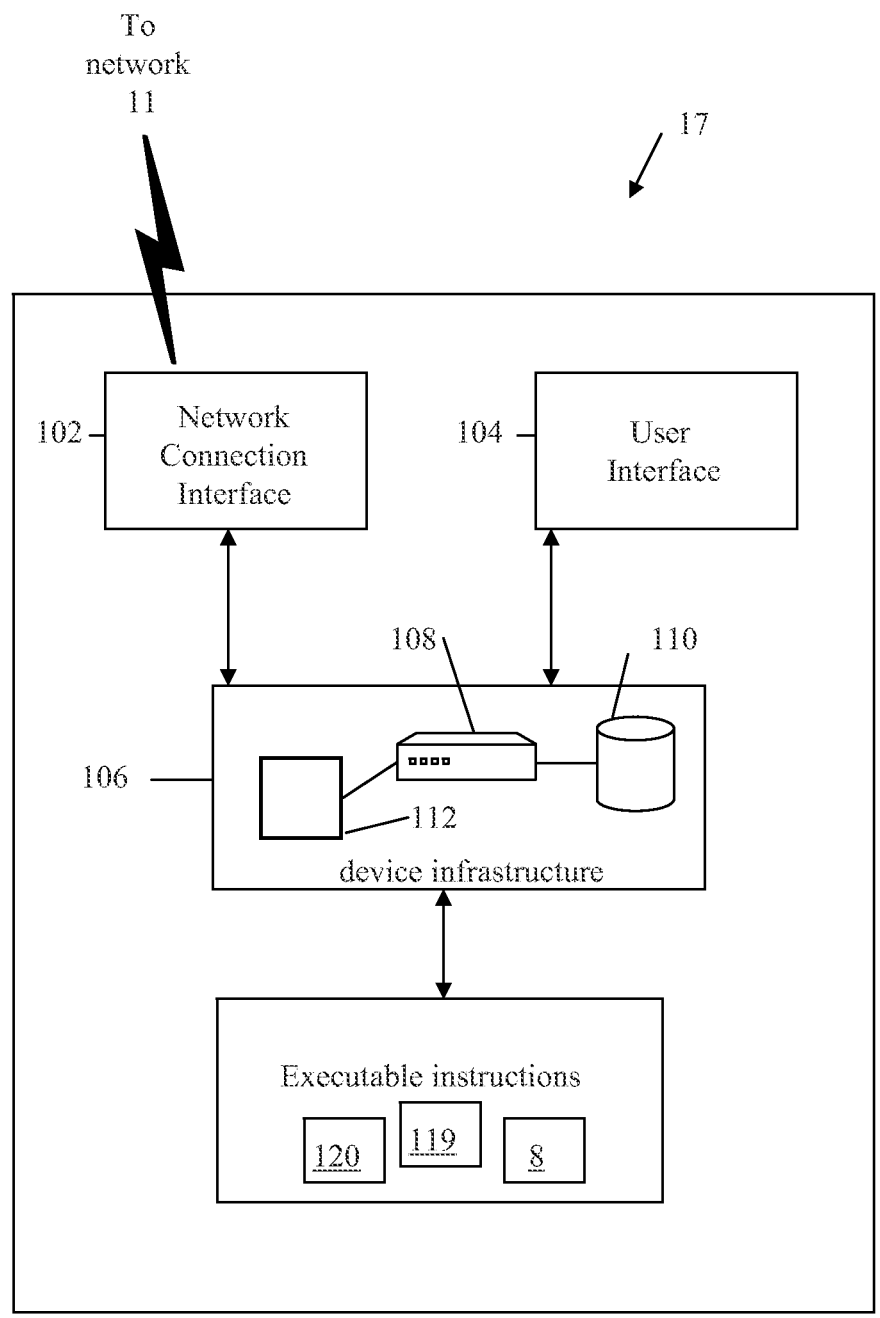
FIG. 8 is a block diagram of a computer device implementing the merchant interface of FIG. 2.

Referring to FIG. 8, the device 17 can be a wireless-enabled (e.g. WiFi, WAN, etc.) personal data assistant, or email-enabled wireless telephone, for example a tablet. In addition, the wireless communications are not limited to only facilitating transmission of text data (e.g. encrypted) and can therefore be used to transmit image data, audio data or multimedia data, for example, as desired. The device 17 can also be a network server or an association of computer devices such as a POS terminal, both wired and wireless.

As shown in FIG. 8, the device 17 can comprise a communication network interface 102, a user interface 104, and a data processing system 106 in communication with the network interface 102 and the user interface 104. The network interface 102 can include one or more antennas for wireless communication over the communications network 11. The user interface 104 can comprise a data entry device (such as keyboard, microphone or writing tablet), and a display device (such as an LCD display).

The data processing system 106 includes a central processing unit (CPU) 108, otherwise referred to as a computer processor, and a non-volatile or volatile memory storage device (e.g. DISC) 110 (such as a magnetic disc memory or electronic memory) and a read/write memory (RAM) 112 both in communication with the CPU 108. The memory 110 includes data which, when loaded into the RAM, comprise processor instructions for the CPU 108 which define memory objects for allowing the device 6 to communicate with the computer devices 6,12 over the communications network 11. The instructions can be used to provide or otherwise host the merchant interface 8 as a website running on the computer device 17 and accessed via the network 11.

The CPU 108 is configured for execution of the merchant interface 8 for facilitating communication with the computer devices 6,12. For example, it is recognised that the merchant interface 8 is used to coordinate, as implemented by the CPU 108, the generation, receipt, and processing of the textual information 201 and the symbology information 204 of the OMRI 200, interpretation or other processing and/or transmission or retransmission of the product code data 3, as well as coordinating the transfer of data 206,208,210,211,203 or data 3 via network messages 13 between the devices 6,12, 17.

The CPU 108 facilitates performance of the device 17 configured for the intended task (e.g. of the respective module(s) of the merchant interface 8) through operation of the network interface 102, the user interface 104 and other application programs/hardware (e.g. web service made available through the merchant interface 8) of the device 17 by executing task related instructions. These task related instructions can be provided by an operating system, and/or software applications located in memory, and/or by operability that is configured into the electronic/digital circuitry of the processor(s) 108 designed to perform the specific task(s). Further, it is recognized that the device infrastructure 106 can include the computer readable storage medium 110 coupled to the processor 108 for providing instructions to the processor 108 and/or to load/update the instructions. The computer readable medium 110 can include hardware and/or software such as, by way of example only, memory cards such as flash memory or other solid-state memory. The storage 110 can also contain the customized coding interpretation scheme 209 for use in encoding and/or decoding the OMRI 200 or otherwise interpreting the product code data 3.

Further, it is recognized that the device 17 can include the executable applications comprising code or machine readable instructions for implementing predetermined functions/operations including those of an operating system and the modules associated with any of the functionality of the systems 80,90 for example. The processor 108 as used herein is a configured device and/or set of machine-readable instructions for performing operations as described by example above, including those operations as performed by any or all of the modules associated with any of the functionality of the systems 80,90. As used herein, the processor 108 may comprise any one or combination of, hardware, firmware, and/or software. The processor 108 acts upon information by manipulating, analyzing, modifying, converting or transmitting information for use by an executable procedure or an information device in relation to transaction 5 processing, and/or by routing the information with respect to an output device. The processor 108 may use or comprise the capabilities of a controller or microprocessor, for example.

Example Merchant Interface 8

The merchant interface 8 can be configured as a thick client of the generation capabilities (generation module 62) of the transaction service 20, such that the merchant interface 8 is provisioned with transaction and/or processing functionality similar to (or at least a portion of) that functionality of the transaction processing system 80 and/or processing system 90 as described above for the transaction service 20 and below as further examples of the system 80,90 functionality. It is recognized that the thick client version of the merchant interface 8 could be configured to perform some of the processing on behalf of or otherwise in substitution of any of the processing functionality of the processing/generation system implemented by the transaction service 20 during processing of the transaction 5. It is also recognized that the thick client version of the merchant interface 8 could also be configured to communicate over the network 11 via a series of web pages as generated or otherwise received by the merchant interface 8, sent as network messages between the computer device 17 and the transaction service 20. It is also recognized that the merchant interface 8 could request or otherwise obtain the OMRI 200 pertaining to the transaction 5 directly from the transaction service 20, i.e. operating as a thin client of the transaction service 20, rather than directly generating the OMRI 200 or the product code data 3 using systems of the merchant interface 8 itself. In either case, the following description of the module 62 can be representative of the generation capabilities of the module 62 of the merchant interface 8 and/or of the module 62 of the transaction service 20, as desired.

Referring to FIG. 8, shown is an example configuration of the merchant interface 8 that can include a network communications module 50 for receiving order request messages from the computer device 12 and for sending order response messages to the computer device 12 over a communication network 11. The communication network 11 can be a one or more networks, for example such as but not limited to: the Internet; an extranet; and/or an intranet. Further, the communication network 11 can be a wired or wireless network. It is also recognized that network messages can be communicated between the computer device 12 and the network communications module 50 via short range wireless communication protocols such as but not limited to Bluetooth™, infrared (IR), radio frequency (RF), near field communication (NFC) and other protocols as desired.

The network communications module 50 can also be configured to send and receive order confirmation messages over the communications network 11 with respect to the payment transaction processing system 14. Also included is a database 110 containing product data 206 (e.g. product pricing, product descriptions, product availability, etc.), merchant data 208 (e.g. merchant bank account number, a unique merchant reference ID of the merchant assigned by the transaction interface 15, tax or merchant business registration details), and network 11 address information of the transaction interface 15. The database 110 can also have customized OMRI definitions of a customized coding scheme 209 containing relationships (e.g. rules) between machine readable symbology and codewords used to encode (or decode) invoice information during generation of the OMRI 200 or the product code data 3 used to represent the transaction 5.

For example, the customized coding scheme 209 can be used to encode (i.e. translate) unencoded (e.g. text based) information 201 of the transaction 5 into symbology information 204, performed during generation of the OMRI 200. The customized coding scheme 209 can also be used to decode (i.e. interpret) symbology information 204 present in the OMRI 200 into unencoded information 201 of the transaction 5 during processing of the OMRI 200 (e.g. by the computer device 12 and/or the transaction interface 15). It is recognized that the customized coding scheme 209 is known to the transaction interface 15 (e.g. by its OMRI generation module 62) and can include customized codewords pertaining to specific invoice information such as but not limited to:

merchant ID, consumer ID; invoice amounts; invoice number; etc. It is recognized that processing of the product code data 3 can be done by accessing the lookup table 63 of the transaction service 20 and/or a local lookup table 63 resident or otherwise accessible external to the transaction service 20.

Referring again to FIG. 9, the merchant interface 8 also has an order generation module 60 used to collect the transaction 5 data (e.g. product data 206, merchant data 208, consumer data 209 and/or transaction data 210—see FIG. 3) for the plurality of products ordered/selected by the consumer 18 during interaction (e.g. online) with the merchant interface 8 via the computer device 12 (e.g. over the communications network 11). It is recognized that product data 206 and some of the consumer data 211 of the transaction 5, such as specific products ordered and quantity of each product, could be provided to the order generation module 60 obtained from order request messages (e.g. via the network communications module 50). Further, the order generation module 60 would collect (or otherwise receive) the merchant data 208 for the transaction 5 from the database 110 as well as pricing information (e.g. product data 206) of the ordered products. The order generation module 60 also generates the transaction data 210 pertaining to product pricing total (optionally including applicable taxes) that includes the total invoice amount owed by the consumer and merchant identification information (associated with or otherwise embodying the merchant bank account information) of the transaction 5. For example, in terms of the merchant bank account information, this could be supplied as part of the merchant information included in the transaction 5 data or this could be supplied as a merchant identification information (e.g. merchant ID) used by the transaction interface 15 to lookup the actual merchant bank account information known to the transaction interface 15 and therefore abstracted from the consumer 18.

The merchant interface 8 has the module 62 that can be configured to use the available transaction 5 data and the customized coding scheme 209 to generate the OMRI 200 or populate the lookup table 63 in the case of the product code data 3. It is recognized that the OMRI 200 or the product code data 3 can be generated by the module 62 to contain data of the transaction 5 pertaining to the product(s) chosen by the consumer 18, including payment transaction data needed by the processing system 14 or transaction interface 15 to settle the transaction (associated with the transaction 5 data), including optionally transferring funds from a specified account of the consumer 18 to a specified account of the merchant 16. In this example, it is envisioned that the merchant 16 would preregister with the transaction interface 15 and be provided with a merchant ID that is associated with the merchant's actual account information 117 (and any other sensitive merchant information) stored in a secure database 110 of the transaction interface 15.

It is also envisioned as an alternative embodiment, that the OMRI module 62 can be configured to not generate some or all of the OMRI 200 or the product code data 3, rather send via request messages the relevant data of the transaction 5 (as collected by the order generation module 60) to the transaction interface 15. In response, the merchant interface 8 would receive via the response messages the generated OMRI 200 or the product code data 3, for subsequent use in providing the OMRI 200 or the product code data 3 to the consumer 18. In this case, the OMRI module 62 of the transaction interface 15 is the entity that generates the OMRI 200 or the Product code data 3 upon request of the merchant interface 8.

Referring again to FIG. 9, the merchant interface 8 can also optionally have a presentment module 63, used by the merchant 16 to physically and/or electronically display the OMRI 200 or the product code data 3 (e.g. audibly in the case of the product code data 3) to the consumer 18, for example when ordering and payment of the merchant products are occurring at the point of sale (POS). The POS is defined as a checkout location where the order transaction is initiated and confirmation of transaction acceptance or rejection is received, such that the merchant 16 is the business (bricks and mortar store or service) that takes payment from the consumer 18 for the merchant's products. Therefore, it should be recognized that the merchant interface 8 of the POS system can defined to include (or otherwise be associated with—e.g. in communication with via a local area network—not shown) a physical POS terminal (e.g. an electronic cash register) in physical proximity to the consumer 18 at the time of product order and purchase. For example, the presentment module 63 can be configured to provide instructions to a printer for physically printing the OMRI 200 or the product code data 3 and/or can be configured to provide instructions to an electronic display for displaying the OMRI 200 or the product code data 3. In either case, the OMRI presentment module 63 is configured to present the OMRI 200 or the product code data 3 to the consumer 18 for subsequent image capture (of the OMRI 200) or data capture (e.g. text entry input via the user interface) of the product code data 3 using the consumer's computer device 12 (i.e. mobile device).

Encoding

One example of the customized coding interpretation scheme 209 for barcodes is a modified UPC (Universal Product Code) to include invoice specific data. Another example is a modified QR scheme, as further described below. The numbers and/or letters (e.g. ASCII—American Standard Code for Information Interchange) stored in the symbology information 204 of the OMRI 200 are unique identifiers representing the particular standard code and custom code (representing invoice specific data) defined in the customized coding scheme 209 that, when read by a OMRI decoder, can be used to look up additional information about the invoice item associated with the OMRI 200. For example, the price, and optional description, of the product would be encoded in the OMRI 200 using the symbology information 204.

Accordingly, the OMRI module 62 can take the payment data and use the codes and associated rules of the customized coding interpretation scheme 209 to convert a piece of the unencoded information 201 (for example, a letter, word, phrase, etc.) of the transaction 5 data into another form or representation (one sign into another sign), not necessarily of the same type, i.e. the symbology information 204. In information processing performed by the OMRI generation module 62, encoding is the process by which information 201 of the transaction 5 is converted into symbols (of the symbol format 204 defined by the customized coding scheme 209) to be communicated. Decoding is the reverse process, converting these code symbols 204 back into unencoded information 201 understandable by a receiver. Therefore, the symbology information 204 generated from the unencoded information 201 of the transaction 5 data is used by the OMRI generation module 62 to construct the OMRI 200, according to the customized coding scheme 209. This OMRI 200 is made available to the network communications module 50 to be sent in the order response message (for example) to the computer device 12 (e.g. displayed on a browser screen of the user interface 104 of the computer device 12—see FIG. 5, delivered as an image file in the network message, etc.). It is recognized that the OMRI 200 represents symbolically the unencoded data 201 of the transaction 5.

Referring again to FIGS. 2 and 4, the transaction 5 is used by the consumer 18 and the merchant 16 to define what has been purchased, when, by whom, from whom, and how much money has been spent on what. The OMRI 200 is generated to include the symbology information 204 as product information 201 for two or more products (for example) as the transaction 5, such that the symbology information 204 of the OMRI 200 encodes information 201 of product data 206, merchant data 208, consumer data 211 and/or transaction data 210 of the transaction 5. Therefore, the OMRI 200 represents at least part of the transaction 5, using the symbology information 204, defined as a commercial contract issued by the merchant 16 to the consumer 18, indicating the products, quantities, and/or agreed prices for products the merchant has (or will) provide the consumer 18 in exchange for payment (i.e. debit of consumer account and corresponding debit of merchant account) of the transaction 5. Further, the transaction 5 can indicate the consumer 18 must pay the merchant 16, according to any payment terms contained in the transaction 5. It is also recognized that the transaction 5 in a rental or professional services context could also include a specific reference to the duration of the time being billed, so rather than quantity, price and cost, the invoicing amount can be based on quantity, price, cost and duration. For example, the rental/services transaction 5 can refer to the actual time (e.g. hours, days, weeks, months, etc.) being billed.

It is recognized that from the point of view of a merchant 16, the transaction 5 can be regarded as a sales invoice. From the point of view of the consumer 18, the transaction 5 can be regarded as a purchase invoice. The transaction 5 can identify both the consumer 18 and the merchant 16, but the term "invoice" generally refers to the fact that money is owed or owing between the merchant 16 and consumer 18.

For example, the product data 206 of the symbology information 204 can include for each product, information such as but not limited to: a product identifier (e.g. product number or code—such as a UPC code), a product purchase price (e.g. unit price of the product), a quantity number of the product (e.g. the number 2 in the case where two of the same product in the purchase order); and/or a description of the product. The merchant data 208 of the symbology information 204 can include information such as but not limited to: name and contact details of the merchant; a bank account number of the merchant; a unique merchant reference ID of the merchant assigned by the processing system 14; location of the merchant retail location; tax or merchant registration details (e.g. tax number or business number such as a VAT (value added tax) identification number or a registration number for GST purposes in order to claim input tax credits) and/or indication of whether the purchase is an online or physical retail location purchase. The transaction data 210 of the symbology information 204 can include information such as but not limited to: a unique reference number (for use in tracking correspondence associated with the transaction 5); date of the transaction; tax payments as a percentage of the purchase price of the each of the products (e.g. GST or VAT); date (e.g. approximate) that the products were (or are to be) sent or delivered; purchase order number (or similar tracking numbers requested by the consumer 18 to be mentioned on the transaction 5); total amount charged (optionally with breakdown of taxes) for the product(s); payment terms (including method of payment, date of payment, and/or details about charges for late payment); international customs information; shipping destination; and/or shipping origination location. It is recognized that the data 206,208,210,211 of the symbology information 204 is also represented in at least whole or in part in the unencoded information 201. In this manner, what symbology information 204 in the OMRI 200 can be decoded (e.g. by the computer device 12 and/or the transaction interface 15) into the information 201, and the information 201 can be encoded (by the transaction interface 15) into the symbology information 204.

In terms of consumer data 211, this data of the symbology information 204 can include information such as but not limited to: a reference code to be passed along the transaction identifying the payer (e.g. consumer 18); name and contact details (e.g. address) of the consumer 18; and/or an account number (e.g. a bank account number, a credit card number, a debit card number of the consumer 18) identifying the source of funds to be used to pay for the products. It is recognized that the account number identifying the consumer 18 source of funds to be used to pay for the products, instead of being encoded in the symbology 204, can be supplied by the consumer 18 using the user interface 104 of the consumer computer device, as further described below.

As discussed above, it is recognized that the customized coding scheme 209 contains codewords and rules for use in translating (i.e. encoding, decoding) between the symbology information 204 of the OMRI 200 and the unencoded information 201 of the transaction 5.

Example Transaction Application 113 Configuration

Figure 10:
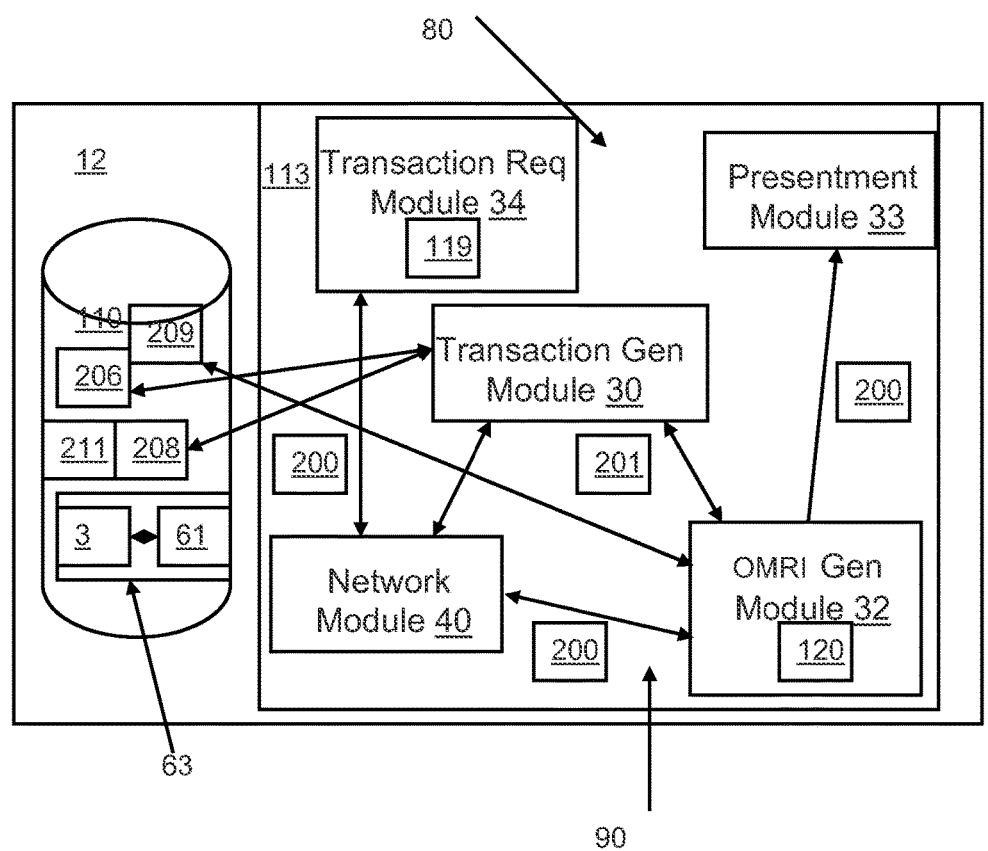
FIG. 10 is a block diagram of a transaction application of FIG. 2.

Referring to FIG. 10, it is recognized that the transaction application 113 can include a plurality of OMRI 200 or the product code data 3 related processing functionality, a plurality of transaction processing functionality and/or client functionality configured for network 11 communication with a transaction interface 15 in a client-server relationship (in association with or in substitution of the systems 80,90 capabilities and functionalities. For example, the transaction application 113 can be configured as a thin client of the transaction interface 15, such that the transaction application 113 is configured to interact with processing systems 80,90 of the transaction interface 15 via a series of web pages generated by the processing systems 80,90 of the transaction interface 15, sent via network messages and displayed on the user interface 104 of the computer 12. Accordingly, the transaction application 113 would interact with a web browser (or other network communication program) to send and receive the messages via the network 11 containing transaction 5 specific information, i.e. to display the web pages on the user interface 104 including output data for the transaction 5 and to coordinate the entry of input data on the user interface 104 and network transmission of the input data for the transaction 5.

Alternatively, the transaction application 113 can be configured as a thick client of the transaction interface 15, such that the transaction application 113 is provisioned with transaction and/or OMRI or the product code data 3 processing functionality similar to (or at least a portion of) that functionality of the processing system 80 and/or generation system 90 of the transaction interface 15, as further described below. It is recognized that the thick client version of the transaction application 113 could be configured to perform some of the transaction or OMRI or the product code data 3 processing on behalf of or otherwise in substitution of any of the processing functionality of the processing system 80 and/or the generation system 90 implemented by the of the transaction interface 15 during processing of the transaction 5. It is also recognized that the thick client version of the transaction application 113 could also be configured to communicate over the network 11 via a series of web pages as generated or otherwise received by the of the transaction interface 15, sent as network messages between the computer devices 6,12 and the transaction interface 15.

Referring to FIGS. 2 and 10, the transaction application 113 can be configured as a client application of the transaction service 20, is configured for generation (i.e. encoding) and presentment of the OMRI 200 or the product code data 3 to the transaction interface 15, and/or is configured for processing (i.e. decoding) of the presented OMRI 200 or the product code data 3 (e.g. table 63 lookup) and generation of payment request to the transaction service 20. The transaction application 113 is also configured to provide a graphical interface (on the user interface 104—see FIG. 5), for example, to facilitate entry of information for the merchant 16 as well as entry of the payment amount requested (e.g. via a transaction generation module 30). The transaction application 113 is also configured to provide a graphical interface, for example, to facilitate entry of consumer 18 information.

Referring to FIG. 10, shown is an example configuration of the transaction application 113 that can include a network communications module 40 for communicating (e.g. sending or receiving) request messages between the computer devices 6,12 and for communicating (e.g. sending or receiving) messages between the computer devices 6,12 over the communications network 11. The network communications module 40 is also configured for sending a transaction request (e.g. a request containing the appropriate payment data of the request to allow to the transaction processing system 14 to coordinate the payment processing and actual funds transfer between accounts 70,72) as well as receiving transaction confirmation messages from the transaction service 20 (containing information indicating that the appropriate account 70,72 has been credited or debited as the case warrants) and that the transaction 5 has been completed.

The confirmation message(s) received by the transaction application 113 could contain details of the payment processing including that the account was (or will be) credited/debited by the payment amount of the transaction 5, as well as any transaction data 210 (see FIG. 4) identifying the transaction 5 (e.g. transfer ID, consumer ID, description of the products, etc.) for their accounting records. It is recognized that the transaction application 113 would could also receive confirmation message(s) containing details of the payment processing including that the account was (or will be) debited by the payment amount of the transaction 5, as well as any transaction data 210 identifying the transaction 5 (e.g. transfer ID, merchant ID, description of the products, etc.) for accounting records.

The network communications module 40 can also be configured to send and receive the transaction confirmation messages over the communications network 11 with respect to the transaction service 20. Also included is a database 110 containing any optional product data 206 (e.g. product descriptions, product availability, etc.), data 208 (e.g. bank account number, a unique reference ID of the merchant assigned by the transaction service 20 (e.g. via the registration module 60—see FIG. 11), tax or merchant business registration details, and registration details 117 of the merchant), consumer data 211 (e.g. consumer bank account number, a unique consumer reference ID of the consumer assigned by the transaction service 20 (e.g. via the registration module 60—see FIG. 11), tax or consumer business registration details, and registration details 117 of the consumer) and network 11 address information of the transaction service 20. It is recognize that preferably the transaction application 113 of the merchant 16 does not have access to sensitive consumer data 211 (e.g. PIN numbers and/or actual bank account numbers) and preferably the transaction application 113 of the consumer 18 does not have access to sensitive merchant data 208 (e.g. PIN numbers and/or actual bank account numbers).

The database 110 can also have customized OMRI definitions of a customized coding scheme 209 containing relationships (e.g. rules) between machine readable symbology and codewords used to encode (or decode) transaction 5 information during generation of the OMRI 200 used to represent the transaction 5. For example, the customized coding scheme 209 can be used to encode (i.e. translate) information 201 (see FIG. 4) of the transaction 5 into symbology information 204, performed during generation of the OMRI 200 (e.g. by the computer device 12 and/or the transaction service 20). The customized coding scheme 209 can also be used to decode (i.e. interpret) symbology information 204 present in the OMRI 200 into text based information 201 of the transaction 5 during processing of the OMRI 200 (e.g. by the computer device 12 and/or the transaction service 20). It is recognized that the customized coding scheme 209 can be known to the transaction service 20 and can include customized codewords pertaining to specific funds information such as but not limited to: registration details 117 of the merchant and/or consumer, merchant ID, consumer ID; payment amounts; transaction number(s); etc.

Referring again to FIG. 10, the transaction application 113 also has a transaction generation module 30 used to collect the transaction 5 data (e.g. product data 206, data 208, data 211 and/or transfer data 210) associated with the transaction 5 selected/entered by the consumer 18 during initiation of the transaction 5. It is recognized that optional product data 206 and some of the data 211 of the transaction 5, such as specific products ordered and quantity of each product, could be provided to the transaction generation module 30 obtained from request messages (e.g. via the network communications module 40). Further, the transaction generation module 30 would collect (or otherwise receive) the data 208 for the transaction 5 from the database 110. The transaction generation module 30 also generates the transaction 5 data optionally including total payment amount owed (for example) by the consumer 18 and merchant identification information (associated with or otherwise embodying the merchant bank account information) of the transaction 5. For example, in terms of the merchant bank account information, this could be supplied as part of the merchant information included in the transaction 5 data or this could be, supplied as a merchant identification information (e.g. merchant ID) used by the transaction service 20 to lookup the actual merchant bank account information known to the transaction service 20 (e.g. via the registration module 60—see FIG. 10) and therefore abstracted from the consumer 18.

It is recognized that the transaction generation module 30 could also be configured to provide to the user of the computer device 12 (via a presented graphical user interface on the user interface 104 of the computer device 12) the ability to select or otherwise enter the desired account (e.g. specifying a credit card number, a debit card number, or any other account information for use in accepting/paying the payment amount). The transaction generation module 30 could also provide, via the graphical user interface, the ability of the consumer or merchant to enter their PIN (or other password information specific to accessing their financial accounts directly) associated with the specified account, thereby indicating that the user of the computer device 12 (or merchant device 17) at the time of generating the transaction and resultant OMRI 200 has the authority to authorize the transaction service 20 (e.g. via the transfer processing module 65) to coordinate transfer involving the specified account. The PIN, or other password information specific to accessing the selected financial accounts directly, can be considered as part of the data 211 included in the payment transaction transfer 5 data and included in the symbology information 204, either directly or otherwise abstracted during generation of the OMRI 200. For example, the PIN or other password information would not be the actual PIN or password information made available to the financial institutions of the accounts 70,72, rather would be reference information used by the transaction service 20 (e.g. via the registration module 60) to look up the actual PIN or password information stored in the registration details 117 of the consumer 18 using the reference PIN or password provided by the consumer 18 during generation of the OMRI 200.

This use of PIN or password information is advantageous, in addition to any passwords required to access the computer device 12 in general (e.g. device login) and/or login to the transaction application 113 specifically, as the owner of the computer device 12 would not want any unauthorized access to their financial accounts to occur. It is also envisioned that the entered PIN or password information could be done by the user in order to login to the transaction application 113 itself (i.e. access the functionality of the transaction application 113 provisioned on the computer device 12). It is also recognized that the user of the computer device 12 may wish to have separate PINs or passwords associated with each account accessible through the transaction application 113 itself (e.g. selectable) and/or known to the transaction service 20 (e.g. via the registration module 60) via the registration details 117, in addition to a general login (including password) to the computer device 12 and/or payment application in general.

The transaction application 113 can also have a generation module 32, including an encoder 120, that is configured to use the available/collected transaction 5 data and the customized coding scheme 209 to generate the OMRI 200 or the product code data 3. It is recognized that the OMRI 200 or the product code data 3 is generated by the generation module 32 to contain data of the transaction 5 pertaining to the payment amount, including payment transaction data needed by the transaction service 20 to coordinate settlement of the financial transaction (associated with the transaction 5 data) via the transaction processing system 14 in transferring funds from the specified account of the consumer 18 to the specified account of the merchant 16. In this example, it is envisioned that the merchant 16 is preregistered (i.e. has provided the registration details 117) with the transaction service 20 and is provided with a merchant ID (e.g. via the registration module 60) that is associated with the merchant actual account information (and any other sensitive requestor information), both of which are stored in a secure database 110 of the transaction service 20 (thereby providing for the lookup by the registration module 60).

Encoding

One example of the customized coding interpretation scheme 209 for barcodes is a modified UPC (Universal Product Code) to include invoice specific data. Another example is a modified QR scheme, as further described below. The numbers and/or letters (e.g. ASCII—American Standard Code for Information Interchange) stored in the symbology information 204 of the OMRI 200 are unique identifiers representing the particular standard code and custom code (representing transaction and OMRI specific data) defined in the customized coding scheme 209 that, when read by the OMRI decoder 119 or encoder 120, can be used to look up additional information about the transaction item associated with the OMRI 200. For example, the payment amount, and optional description, of the product would be encoded in the OMRI 200 using the symbology information 204.

Accordingly, the OMRI generation module 32 takes the transaction 5 data (i.e. as the information 201) and uses the codes and associated rules of the customized coding interpretation scheme 209 to convert a piece of the information 201 (for example, a letter, word, phrase, etc.) of the transaction 5 data into another form or representation (one sign into another sign), not necessarily of the same type, i.e. the symbology information 204. In information processing performed by the OMRI generation module 32, encoding is the process by which textual information 201 of the transaction 5 is converted into symbols (of the symbol format 204 defined by the customized coding scheme 209) to be communicated/presented. Decoding is the reverse process, converting these code symbols 204 back into information 201 understandable by a receiver. Therefore, the symbology information 204 generated from the information 201 of the transaction 5 data is used by the OMRI generation module 32 to construct the OMRI 200, according to the customized coding scheme 209. This OMRI 200 can be made available to the network communications module 40 to be sent in the request message (delivered as an image file for example) to the computer device 6 or can be displayed on a browser screen of the user interface 104 of the computer device 12. It is recognized that the OMRI 200 represents symbolically the data 201 of the transaction 5 and associated payment request.

Referring to FIG. 10, the transaction application 113 also has a transaction request module 34, including the decoder 119, used to decode the received OMRI 200, select or otherwise enter (e.g. via a provided graphical user interface generated by the transaction application 113 on the user interface 104 of the computer device 12) account information of the consumer 18 as well as any other relevant data 211, and to generate the transaction request directed to the transaction service 20. It is recognized that the transaction request could include decoded transaction 5 data (e.g. information 201) obtained from the symbology information 204 of the OMRI 200, and/or at least some of the symbology information 204 itself of the OMRI 200), as well as account data 211 pertaining to the selected mode of payment/credit and any other input data 215.

It could be advantageous for security purposes to allow the transaction request module 34 to decode only a portion of the symbology information 204 (of the OMRI 200) pertinent to the consumer 18 (e.g. non-sensitive merchant identification information, unique transfer ID, etc.) and to leave any merchant sensitive information (e.g. merchant account information, for example including PIN or password data) as undecoded (i.e. remain encoded) from the symbology information 204 and therefore abstracted from the consumer 18. In this manner, the decoder 119 of the transaction request module 34 would not have the ability to decode certain sensitive information in the symbology information 204 pertaining only to the merchant 16, in other words only that payment data common to both of the merchant 16 and the consumer 18 is decodable by the decoder 119 (common information for example could be payment amount, transfer ID, product description, names of merchant and consumer).

One embodiment, to provide for the sensitive portions of the symbology information 204 to remain undecoded, is where the decoder 119 (of the transaction application 113) of the computer device 12 does not have access to the encryption key used by the encoder 120 used to generate the merchant specific details of the OMRI 200. Further, in this example, it is recognized that in the event where the transaction service 20 does receive encoded symbology information 204 in the transaction request, the transaction service 20 (e.g. via the registration module 60) would have access to the requestor encryption key and/or the responder encryption key via their respective registration details 117 stored in the database 110.

In cryptography, the encryption key can be defined as a piece of information (a parameter) that determines the functional output of a cryptographic algorithm or cipher (i.e. as implemented by the encoder 120 or decoder 119). Without the key, the algorithm of the encoder 120 or decoder 119 would produce no useful result (i.e. the decoded symbology information 204 would be meaningless). In encryption, the key specifies the particular transformation of plaintext into ciphertext, or vice versa during decryption. Keys can be used in cryptographic algorithms, such as digital signature schemes and message authentication codes.

Further, the transaction request module 34 could also be configured to provide to the user of the computer device 12 (via a presented graphical user interface on the user interface 104 of the computer device 12) the ability to select or otherwise enter the desired account (e.g. specifying a credit card number, a debit card number, or any other account information for use in accepting/paying the payment amount). The transaction request module 34 could also provide, via the graphical user interface, the ability of the consumer 18 to enter their PIN (or other password information specific to accessing their financial accounts directly) associated with the specified account, thereby indicating that the user of the computer device 12 at the time of generating the transaction request has the authority to authorize the transaction service 20 (e.g. via the transaction processing module 65) to coordinate funds transfer involving the specified account. The PIN, or other password information specific to accessing the selected financial accounts directly, can be considered as part of the data 211 included in transaction request data, either directly or otherwise abstracted during generation of the transaction request. For example, the PIN or other password information would not be the actual PIN or password information made available to the financial institutions of the accounts 70,72, rather would be reference information used by the transaction service 20 (e.g. via the registration module 60) to look up the actual PIN or password information stored in the registration details 117 of the consumer 18 using the reference PIN or password information provided by the consumer 18 during generation of the transaction request.

Decoding

One example of the customized coding interpretation scheme 209 for barcodes is modified UPC (Universal Product Code). The numbers and/or letters (e.g. ASCII—American Standard Code for Information Interchange) encoded in the OMRI 200 are unique identifiers representing the particular custom code defined in the customized coding scheme 209 that, when read by the OMRI decoder 119, can be used to look up additional information about the invoice item associated with the OMRI 200. For example, the payment amount and optional description of the product would be stored in the OMRI 200 using the symbology information 204, as well as any pertinent data 208 and/or data 211. The decoder 119 circuitry and/or software is used to recognize and/or to make sense of the symbology information 204 that make up OMRI 200. The decoder 119 can translates symbols 204 into corresponding digital output in a traditional data format (i.e. as information 201). In order to decode the information in OMRI 200, for example for 1D barcodes, the widths of the bars and spaces are recognized via edge detection and their widths measured.

Transaction Service 20 and Transaction Interface 15

Figure 11:
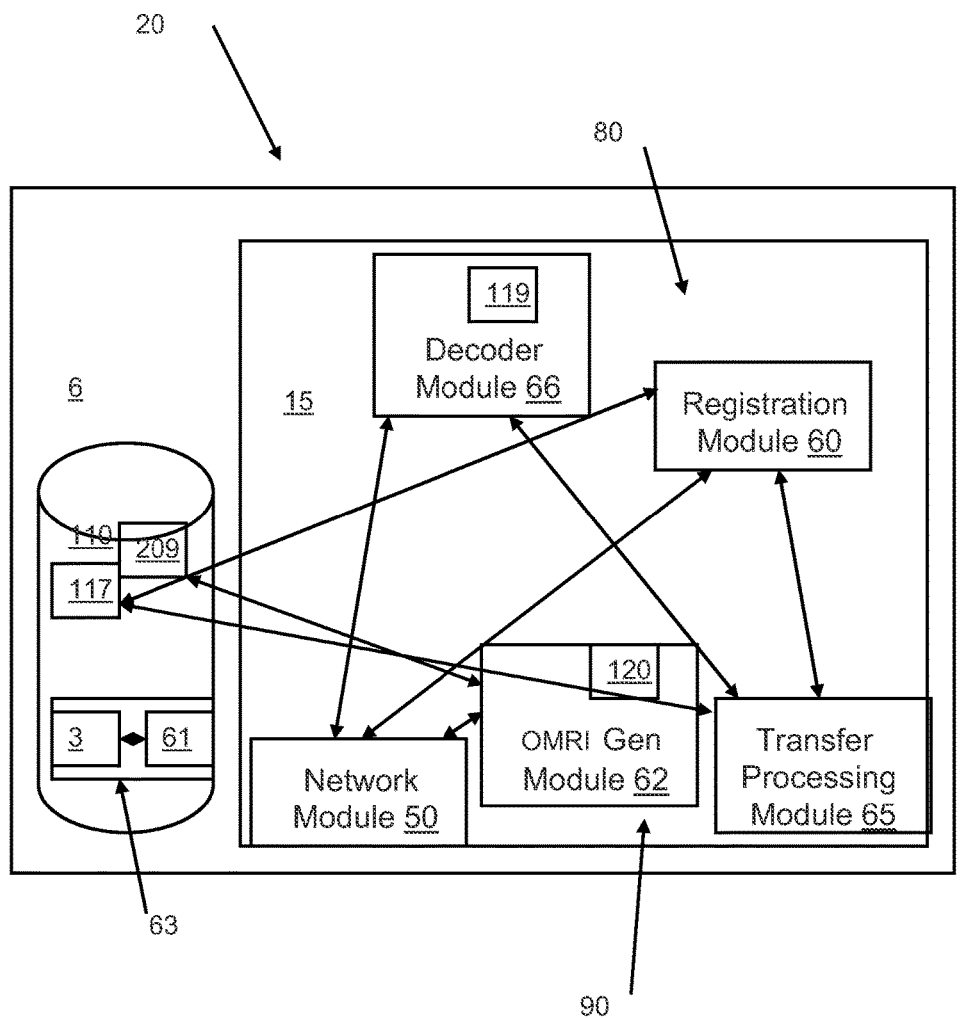
FIG. 11 is a block diagram of a transaction interface of FIG. 2.

Referring to FIG. 11, shown is an example configuration of the transaction service 20 including the computer device 6 (e.g. a web server) hosting the transaction interface 15. The transaction interface 15 can include a network communications module 50 for receiving order request messages (e.g. providing information 201 and expecting a generated OMRI 200 or the product code data 3) from the computer device 12 and for sending processing messages to the transaction processing system 14 over the communications network 11.

The network communications module 50 can also be configured to send and receive transfer confirmation messages to the computer devices 17,12 (in response to the received transaction request messages) over the communications network 11 with respect to the computer devices 17,12. Also included is a database 110 containing registration details 117 of the merchant 16 and/or consumer 16 as discussed above, and network 11 address information of the transaction processing system 14. The database 110 can also have customized OMRI definitions of the customized coding scheme 209 containing relationships (e.g. rules) between machine readable symbology and codewords used to encode (or decode) information during encoding and/or decoding of symbology information 204 of the OMRI 200 used to represent the transaction 5 associated with the payment request.

For example, the customized coding scheme 209 can be used by the OMRI generation module 62 to encode (i.e. translate) text based information 201 of the transaction 5 (including data received from the computer 17) into symbology information 204, performed during generation of the OMRI 200. The customized coding scheme 209 can also be used to decode (i.e. interpret) symbology information 204 present in the OMRI 200 into text based information 201 of the transaction 5 during processing of the OMRI 200. It is recognized that the customized coding scheme 209 is known to the transaction service 20 and can include customized codewords pertaining to specific payment information such as but not limited to: sensitive financial information. As discussed above, the product code data 3 can also be generated by selecting the desired series of alpha and/or numeric characters for the product code data 3 and then populating the lookup table 63 with the information 61 that is mapped to the product code data 3 in the lookup table 63.

Referring again to FIG. 11, the transaction interface 15 also has a registration module 60 used to collect the registration details 117 during registration of the merchant 16 and/or the consumer 18. Further to that discussed above, it is recognized that the registration details 117 can include PIN data and/or password data used to access the specified account(s) 70,72 through the financial institutions of the transaction processing system 14. For example, in terms of the bank account information, this could be supplied as part of the reference account information included in the transaction request, for example used by the registration module 60 to lookup the actual bank account information in the registration details 117 known only to the transaction service 20, and therefore abstracted from the appropriate merchant 16 or consumer 18.

The transaction interface 15 can also have the generation module 62 that is configured, by an encoder 120, to use the received information 201 data and the customized coding scheme 209 to generate the OMRI 200, or populate the lookup table 63 in the case of the product code data 3, for subsequent delivery to the computer device 12 if configured as part of the processing for the transaction 5 (i.e. the computer device 17 sends the information 201 to the transaction service 20 and the transaction service 20 then sends the generated OMRI 200 or the product code data 3 directly to the computer device 12). It is recognized that the OMRI 200 or the product code data 3 can be generated by the generation module 62 to contain data of the transaction 5 pertaining to the payment amount provided by the merchant 16, including transaction data needed by the payment transaction processing system 14 to settle the financial transaction by transferring funds between specified accounts 70,72.

Encoding

One example of the customized coding interpretation scheme 209 for barcodes is a modified UPC (Universal Product Code) to include invoice specific data. Another example is a modified QR scheme, as further described below. The numbers and/or letters (e.g. ASCII—American Standard Code for Information Interchange) stored in the symbology information 204 of the OMRI 200 are unique identifiers representing the particular standard code and custom code (representing invoice specific data) defined in the customized coding scheme 209 that, when read by a OMRI decoder 119, can be used to look up additional information about the invoice item associated with the OMRI 200.

Accordingly, the OMRI generation module 62 takes the text based information 201 data and uses the codes and associated rules of the customized coding interpretation scheme 209 to convert a piece of the information 201 (for example, a letter, word, phrase, etc.) into another form or representation (one sign into another sign), not necessarily of the same type, i.e. the symbology information 204. In information processing performed by the OMRI generation module 62, encoding is the process by which textual information 201 is converted into symbols (of the symbol format 204 defined by the customized coding scheme 209) to be communicated. Decoding is the reverse process, converting these code symbols 204 back into textual information 201 understandable by a receiver. Therefore, the symbology information 204 generated from the textual information 201 is used by the OMRI generation module 62 to construct the OMRI 200, according to the customized coding scheme 209. This OMRI 200 is made available to the network communications module 50 to be sent in the order response message (for example) to the computer device 17 for subsequent delivery to the computer device 12 to be displayed on a browser screen of the user interface 104 of the computer device 12 or otherwise delivered as an image file in the network message. It is recognized that the OMRI 200 represents symbolically the data 201. Alternatively, the network communications module 50 could send the OMRI 200 in the message directly to the computer device 12 (e.g. displayed on a browser screen of the user interface 104 of the computer device 12 or otherwise delivered as an image file in the network message, etc.).

Referring to FIG. 11, the transaction interface 15 can also have a decoder module 66, including the decoder 119, used to decode the received OMRI 200 in the case where the transaction request data includes symbology information 204. For example, the decoder 119 could be used to decode account information of the transaction 5 (pertaining to the selected mode of payment/credit of the consumer 18 and optionally including the PIN or password data of the account) as well as any other relevant data 208 from the symbology 204, for example using the respective encryption key stored in the registration details 117 of the merchant 16).

Referring again to FIG. 10, once all of the textual information 201 is received by the transaction interface 15 or otherwise decoded, a transfer processing module 65 can communicate using transaction processing messages with the transaction processing system 14 (for example to complete the transaction by having funds paid, by completing registration or subscription). It is recognized that the transaction processing messages could include decoded transaction 5 data (e.g. textual information 201) obtained from the symbology information 204 of the OMRI 200, and/or as received from the computer device 12, including account data and the payment amount.

Further, the transfer processing module 65 could be configured to confirm whether the received PIN or password information matches the corresponding PIN or password information stored in their respective registration details 117 that is associated with their respective account (e.g. credit card number, a debit card number, or any other account information for use in accepting/paying the payment amount). In the event that the received PIN or password information (for the merchant and/or the consumer) matches the corresponding PIN or password information stored in their respective registration details 117, the transfer processing module 65 has confirmed that at the time of generating the OMRI 200 and/or at the time that the transaction request was generated, the respective merchant 16 and/or the respective consumer 18 had the authority to authorize the transaction service 20 to coordinate funds transfer involving the specified account(s). In the event that the received PIN or password information does not match the corresponding PIN or password information stored in their respective registration details 117, the transfer processing module 65 could deny the transaction request and send notice of the denial back to the computer devices 17,12 via the respective transaction confirmation messages. For example, if both matches fail, then both of the computer devices 17,12 would be notified of the denial. Otherwise if only one of matches failed, then the respective one of the computer devices 17,12 would be notified of the denial.

In any event, the transfer processing module 65 is also configured to receive confirmation message(s) from the transaction processing system 14, such that confirmation message(s) include a confirmation that the payment amount has either been transferred between accounts 70,72 or declined. The confirmation message(s) sent by the transaction service 20 can include instructions to the respective financial institutions (not shown), for example, associated with the consumer and merchant account information to debit the appropriate account 70,72 and credit the appropriate account 70,72 by the payment amount along with the required account data and (optional) PIN or password data. The confirmation message(s) received by the transaction interface 15 from the transaction payment processing system 14 could contain details of the payment processing including that the accounts were (or will be) credited by the amount, as well as any transfer data 210 (e.g. transfer ID) for accounting records.

In is recognized in the above embodiments, that in terms of the account information, this could be supplied as specifically the account number or this could be supplied as identification information (e.g. account ID) used by the transaction service 20 to lookup the actual bank account information known to the transaction service 20 (via the respective registration details 117) and therefore the account number would be abstracted from the general communications over the network 11.

Alternative Embodiments

Further to the above, it is recognised that: the payment account identifier can also identify corresponding payment account information of the consumer, and the payment account information is stored in memory of the transaction server; the scannable image or the product code data 3 can be encoded with unique information that is only relevant to the mobile payment transaction interface; the merchant data includes one or more selected from the group of transaction ID, merchant ID, price and purchased item information; the device data can include one or more selected from the group of: International Mobile Equipment Identity (IMEI) number, phone number, carrier name and geographic location co-ordinates; the transaction request can include one or more account information selected from the group of purchase amount, credit card data and PIN, debit card data and PIN, and stored value account and login information; the mobile device scannable image or the product code data 3 can be presented on print media or electronic media for scanning; the mobile device scannable image or the product code data 3 can be presented on a point of sale terminal for scanning; the mobile device scannable image or the product code data 3 can be generated by a mobile payment merchant interface, the mobile payment merchant interface running on the point of sale terminal; the payment account can be a credit card account, a debit card account, an E-wallet account or other electronic stored value account.

It is recognised that the symbology information 204 of the OMRI 200 can contain unique coded information that is meant for decoding and/or interpretation only by the transaction service 20. As such, some of the symbology information 204 of the OMRI 200, as received by the consumer 18 via the application 113, would contain undecodable data (i.e. the decoder and coding scheme 209 resident on the computer device 12 does not have the capability of decoding the unique coded information) and/or data that if/when decoded by the application 113 does not have any perceivable meaning to the consumer 18. One example of the unique coded information in the symbology information 204, that is preferably obfuscated from the consumer 18 (i.e. undecodable by the application 113), is merchant identifier data (associated with the merchant profile 117 information), any merchant account 72 financial information, and/or any other sensitive information that is desired by the merchant 16 as restricted from access by the consumer 18.

An example of the unique coded information in the symbology information 204 that could be decodable by the application 113 is the transaction type identifier (e.g. indicating restaurant meal, consumer product purchase, service registration, etc.) and/or a security identifier (e.g. a hashtag generated by the merchant interface 8 and/or the transaction interface 15). In this example, the transaction type identifier could be used by the transaction interface 15 to coordinate the content and/or format of the input data 215 as well as the output data 217 communicated between the transaction interface 15 and the application 113. In one embodiment, the configured input data 215 as well as the output data 217 is available in the merchant profile 117 information that is associated with the transaction identifier. In terms of the security identifier, this identifier could be used by the transaction interface 15 to determine whether the OMRI 200 is valid, I.e. is not a counterfeit OMRI 200 and instead contains valid information that was issued (i.e. confirmed) by the transaction service 20 and/or the merchant 16. It is also recognised that the transaction type identifier and/or the security identifier could be decoded from the symbology information 204 by the application 113 but still remain unknown to the consumer 18 as to the relevance of the identifier to the transaction 5.

Further, an advantage with only providing the consumer code data 3 (only representing the payment account information 61 of the consumer 18), by the consumer 18 to the merchant 16, is that the merchant 16 does not have any direct knowledge of the payment account number of the consumer 18 (as this information is only known to the transaction service platform 20 and/or the respective financial institution of the payment processing system 14). It is recognized that separate network 11 connections can be used to transmit the purchase transaction 5 (over network connection A) between the merchant device 17 and the transaction service platform 20 and the consumer code data 3 (over network connection B) between the consumer device 12 and the transaction service platform 20.

For example, the transaction Service 20 can process the purchase transaction 5 by using the consumer code data 3 to identify the actual identity of the consumer 18 (via interrogation of the lookup table 63 to access sensitive account information 61 of the consumer 18 that is cross referenced to the consumer code data 3 in the lookup table 63) and their actual payment account information 61 and send a "request for confirmation" request (e.g. via network connection A) associated with the purchase transaction 5 to the payment application 113 on the Consumer's mobile device 12. The Consumer 18 can then confirm or decline the request for confirmation as a confirmation response back to the transaction Service Platform 20 (e.g. via network connection b), which can then interact with the payment processing system 14 to effect the transfer of funds indicated in the original purchase transaction 5 between the accounts 70,72 of the merchant 16 and the consumer 18.

In another embodiment, the consumer code data 3 can be implemented as a short code service (i.e. unencoded textual information as compared to coded textual information in the form of a barcode 200). The way this works is that instead of scanning or otherwise supply the barcode 200 as the consumer code data 3, the consumer 18 provides a short code (e.g. a sequence of characters including numeric characters and/or alpha characters) that is also known to the transaction Service 20 as the consumer code data 3 used in identifying the actual payment account information 61 stored (in table 63) and accessible by the payment interface 15. Therefore, after providing the consumer code data 3 as a series of numeric characters and/or alpha characters to the merchant application 8, the rest of the split purchase transaction 5 process is exactly the same. One advantage in using the short code is that it works in situations where generating or otherwise scanning/processing the barcode 200 is not feasible by the merchant application 8 and/or the payment application 113.

In another embodiment, the communication means for identifying the Consumer's Payment Account to the transaction Service 20 via the merchant terminal 17 (i.e. via the merchant application 8) can involve the transmission of the Consumer's Payment Account Identifying Information data 3 from the Mobile Device 12 (i.e. via the payment application 113) to the merchant terminal 17 (i.e. via the merchant application 8) using NFC, Bluetooth, Infrared or other similar short-range, communication technology. In the case of a short code being used as the consumer code data 3, the transmission of this consumer code data 3 information to the merchant may be something as simple as verbal transmission between the merchant 16 and consumer 18 and/or by simply reading of the consumer code data 3 off of the screen of the device 12 by the merchant 16—in the case where the consumer code data 3 is displayed on the screen of the device 12 (e.g. via interaction with the payment application 113 by the consumer 18). Another embodiment is where a speaker of the device 12 is used by the payment application 113 to audibly communicate the consumer code data 3 to the merchant 16.

In alternative operation of the mobile payment system 10, consumer sensitive information of card balance and card account number is transmitted directly between the transaction interface 15 and the consumer device 12 over the network 11 (e.g. via network connection B) while the representative consumer code data 3 and product purchase information of the purchase transaction 5 is communicated between the merchant device 17 and the transaction interface 15, thereby providing the advantage of restricting access by the merchant 16 to the payment account information 61 (in this case card account number and account balance) of the consumer 18. An advantage of the mobile payment system 10 is that the merchant 16 and the consumer 18 do not have to expose their personal financial information with one another, including personal identifications numbers (PIN), financial institution account numbers and/or financial account passwords). The purchase transaction 5 can involves the use of the consumer code data 3 that contains encoded account information (i.e. the code data 3 is mapped to the stored payment account information 61 accessible by the transaction interface 15 and therefore restricted from access by the merchant 16 and/or the merchant application 8). As described above, the consumer code data 3 can also be represented as the short code, which is also used as an encoded version of the actual account number to which the consumer code data 3 is associated with (i.e. the consumer code data 3 is mapped to the stored payment account information 61 accessible by the transaction interface 15 via the lookup table 63 and therefore restricted from access by the merchant 16 and/or the merchant application 14).
Code Data 3

In general, as described above, the code data 3 can be represented as the short code, which is also used as a version of the actual information 61 to which the code data 3 is associated with (i.e. the code data 3 is mapped to the stored information 61 in the table 63 and accessible by the transaction interface 15 and therefore can be restricted from access by the merchant 16 and/or the merchant application 8 or by the consumer 18 and/or the application 113 as the case may be). In this embodiment, the code data 3 is implemented as a short code service, such that instead of scanning or otherwise supplying the code data 3 as the barcode 200, the consumer 18 provides a short code (e.g. a sequence of characters including numeric characters and/or alpha characters) that is also known to the transaction Service Platform 20 as the code data 3 used in identifying the actual information 61 stored and accessible by the transaction interface 15. Therefore, after providing the code data 3 as a series of numeric characters and/or alpha characters to the merchant application 8, the rest of the split purchase transaction 5 process is similar to using the barcode 200 also an encoded representation of the actual information 61 that is restricted from access by the merchant 16 and/or the consumer 18 as the case may be (e.g. the consumer 18 can be restricted to access of sensitive merchant data (e.g. merchant account numbers) via use of the code data 3 or the merchant 16 can be restricted to sensitive consumer data (e.g. consumer account numbers) via use of the code data 3). One advantage in using the short code is that it works in situations where generating or otherwise scanning/processing the barcode 200 (also referred to as ORMI) is not feasible by the merchant application 8 and/or the payment application 113. In this manner, the code data 3 is received by the merchant application 8 for subsequent incorporation into the data of the purchase transaction 5 communicated (e.g. via network connection A) directly with the transaction service 20 (e.g. via the transaction interface 15). In this manner, direct access to the information 61 (e.g. actual financial account 72 number and/or account access password such as PIN of the consumer 18) by the merchant 16 is restricted, as the code data 3 is used by the service 20 as a lookup identifier for accessing the actual financial account number information 61 mapped or otherwise associated with the code data 3 stored or otherwise accessible by the transaction interface 15 in a lookup table or index 63.

GLOSSARY

For the purposes of this disclosure, the following terms have been ascribed the following meanings:

Consumer—the mobile device user, the individual making a purchase at a POS.

Electronic Media—Television, Electronic billboards, computer terminals, video display terminals, movies and video projections, and the like.

E-wallet—any electronic stored value system.

OMRI 200—Mobile Device scannable image.

Mobile device—any wireless, web-enabled electronic device, including cell phone, electronic PDA, computer tablet, smartphone or a similar device.

Order Form Data—any Consumer information including, but not limited to, address, phone number, e-mail address, billing address, shipping address and date of birth.

Payment Account—an account held by a Consumer with a financial institution, E-wallet provider, Credit Issuing Company, or the like.

Payment Account Information—information pertaining to a Payment Account, including but not limited to account numbers, account balances, passwords and PIN numbers.

Payment Platform—the computing infrastructure utilized by banks, other financial institutions, E-wallet service providers, money transfer service providers, or the like, that is used to authenticate account holders and/house account holder accounts and process electronic payment from account holder accounts.

POS or Point of Sale—the location where a purchase/sale transaction takes place.

POS Markets—vending machines, bill payments, ATM machines, parking tickets, any OMRI 200 associated product.

POS Terminal or Point of Sale Terminal—any type of electronic payment terminal or transaction terminal including but not limited to ATM machines, vending machines and standard in-store point of sale terminals.

Print Media—Parking tickets, magazines, newspapers, telephone directories, utility invoices, catalogues, posters, billboards, flyers, and the like.

Transaction—the purchase of goods or services, the registration for a service or membership, an ATM transaction or a point of sale transaction.

While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings.

I claim:

1. A non-transitory computer readable storage medium with an executable transaction application stored thereon, the transaction application configured for generating a transaction request by a mobile device user for receipt over a communications network by a transaction interface, a transaction of the transaction request associated with a merchant providing a product to a consumer as the mobile device user, wherein the transaction application instructs a computer processor by execution of a set of instructions stored in a memory of the device to perform the following steps of:

receiving by the computer processor product code data from the merchant, the product code data communicated wirelessly to the transaction application based on contact with the consumer from a consumer environment, the product code data associated with similar product code data stored by the transaction interface in a merchant profile assigned to the merchant, the merchant profile one of a plurality of merchant profiles assigned to respective different merchants, wherein the product code data is, representative of merchant data associated with the product;

initiating by the computer processor the transaction based on said receiving of the product code data;

receiving by the computer processor a transaction type from a plurality of different transaction types associated with the product code data by matched transaction data in the product code data with a matching transaction type record stored in the merchant profile of the merchant, each of the transaction types requiring respective different, input data from the mobile device user for the merchant for workflow instructions other than payment type instructions;

implementing by the computer processor the workflow instructions of the identified transaction type, the workflow instructions appropriate to the identified transaction type by presenting transaction type dependent instructions to the mobile device user on a user interface of the device indicating the required input data, the transaction type dependent instructions of the identified transaction type being different than other transaction type dependent instructions of another transaction type of the plurality of transaction types;

receiving by the computer processor the input data entered by the mobile device user via the user interface in response to the transaction type dependent instructions displayed;

receiving by the computer processor a consumer identifier identifying the mobile device user;

sending by the computer processor the transaction request including the product code data, the input data and the consumer identifier to the transaction interface over the communications network; and receiving by the computer processor a confirmation of approval or denial of the transaction request from the transaction interface that is separate and remote from a merchant interface over the communications network, the merchant interface associated with transaction equipment operated by the merchant, said confirmation displayed to the mobile device user on the user interface of the device.

2. The non-transitory computer readable storage medium of claim 1, wherein the transaction request includes device data of the device executing the transaction application.

3. The non-transitory computer readable storage medium of claim 2, wherein the device data includes one or more selected from the group consisting of: International Mobile Equipment Identity (IMEI) number, phone number, carrier name and geographic location co-ordinates.

4. The non-transitory computer readable storage medium of claim 1, wherein a payment account of the consumer is selected from the group consisting of:
a credit card account;
a debit card account;
an E-wallet account; and
other electronic stored value account.

5. The non-transitory computer readable storage medium of claim 1, wherein the transaction application is further configured to instruct the computer processor to perform the step of: selecting a payment account from a plurality of available payment accounts such that each of the payment account of the plurality of payment accounts has a respective consumer payment account identifier, wherein the input data includes consumer financial account information for use in settling the financial amount via the transaction processing system, the financial account information selected from a plurality of available consumer financial accounts.

6. The non-transitory computer readable storage medium of claim 1, wherein the transaction application is further configured to instruct the computer processor to perform the steps of:
prompting the consumer to enter a personal identification number (PIN) or password associated with a payment account; and
sending said PIN or password to the transaction interface over the communications network.

7. The non-transitory computer readable storage medium of claim 6, wherein said PIN or password is included in the transaction request.

8. The non-transitory computer readable storage medium of claim 1, wherein a payment account identifier also identifies corresponding payment account information of the consumer, and wherein payment account information is not included in the transaction request.

9. The non-transitory computer readable storage medium of claim 1, wherein the product code data is presented on media selected from the group consisting of:
an electronic display media of a point of sale terminal;
print media; and
electronic advertising media.

10. The non-transitory computer readable storage medium of claim 1, wherein said merchant data includes one or more data selected from the group consisting of:
transaction ID;
merchant ID;
product price; and
purchased product information.

11. The non-transitory computer readable storage medium of claim 1, wherein the transaction request comprises one or more data selected from the group consisting of:
product purchase amount;
credit card data and PIN;
debit card data and PIN; and
stored value account and login information.

12. A transaction system for coordinating processing of a transaction request by a mobile device user associated with a transaction between a consumer and a merchant, the transaction associated with the merchant providing a product to the consumer as the mobile device user, the system comprising:

a computer processor coupled to a memory, wherein the computer processor is programmed via a set of instructions stored in the memory to coordinate processing of the transaction request by:

receiving by the computer processor the transaction request from a mobile device of the consumer including a consumer identifier, and a product code data, the product code data associated with similar product code data stored in the memory in a merchant profile assigned to the merchant, the merchant profile one of a plurality of merchant profiles assigned to respective different merchants, the product code data originating from a wireless communication to the mobile device based on contact with the consumer from a consumer environment, wherein the product code data is representative of merchant data associated with the product and the transaction is initiating based on receiving of the product code data by the mobile device from the consumer environment;

accessing by the computer processor a lookup database including the merchant profiles using the product code data to identify a transaction type from a plurality of different transaction types for the merchant in the merchant profile, the transaction type associated with the product code data, each of the transaction types requiring respective different input data from the mobile device user for the merchant for workflow instructions other than payment type instructions;

implementing by the computer processor workflow instructions appropriate to the identified transaction type by sending transaction type dependent instructions for presentation to the mobile device user on a user interface of the device indicating the required input data, the transaction type dependent instructions of the identified transaction type being different than other transaction type dependent instructions of another transaction type of the plurality of transaction types;

receiving by the computer processor the input data entered by the mobile device user via the user interface in response to the transaction type dependent instructions displayed;

using said consumer identifier by the computer processor to identify consumer payment account information;

creating the transaction request by the computer processor using said merchant data, input data and consumer payment account information;

sending said transaction request by the computer processor to a payment platform;

receiving by the computer processor approval of the transaction request from the payment platform in the event the payment account of the consumer has sufficient funds to cover an amount of the transaction; and sending by the computer processor a confirmation of the approval of the transaction request separately to both the mobile device for display to the mobile device user on the user interface and to a computer device associated with the merchant.

13. The transaction system of claim 12, wherein the confirmation is sent to the merchant via a merchant interface running on a point of sale terminal as the computer device.

14. The transaction system of claim 12, wherein the computer processor is further programmed before sending the transaction request to the payment platform to:

prompt the consumer to enter a PIN or password associated with the payment account of the consumer;

receive said PIN or password; and send said PIN or password to the payment platform.

* * * * *